(12) United States Patent
Infanti et al.

(10) Patent No.: US 12,735,208 B2
(45) Date of Patent: Sep. 15, 2026

(54) UNMANNED AERIAL VEHICLE LANDING PLATFORM SYSTEMS AND METHODS

(71) Applicant: FLIR Unmanned Aerial Systems ULC, Vancouver (CA)

(72) Inventors: James Infanti, Waterloo (CA); Albert Pegg, New Dundee (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 112 days.

(21) Appl. No.: 18/418,006

(22) Filed: Jan. 19, 2024

(65) Prior Publication Data

US 2025/0026509 A1 Jan. 23, 2025

Related U.S. Application Data

(60) Provisional application No. 63/440,360, filed on Jan. 20, 2023.

(51) Int. Cl.

| | |
|---|---|
| ***B64U 70/50*** | (2023.01) |
| ***B64U 10/14*** | (2023.01) |
| ***B64U 70/92*** | (2023.01) |
| ***B64U 70/97*** | (2023.01) |
| ***B64U 70/99*** | (2023.01) |
| *B64U 10/60* | (2023.01) |
| *B64U 101/30* | (2023.01) |

(52) U.S. Cl.

CPC ............. *B64U 70/50* (2023.01); *B64U 10/14* (2023.01); *B64U 70/92* (2023.01); *B64U 70/97* (2023.01); *B64U 70/99* (2023.01); *B64U 10/60* (2023.01); *B64U 2101/30* (2023.01)

(58) Field of Classification Search

CPC ........ B64U 70/50; B64U 10/14; B64U 70/92; B64U 70/97; B64U 70/99; B64U 10/60; B64U 2101/30

See application file for complete search history.

(56) References Cited

U.S. PATENT DOCUMENTS

| | | | | |
|---|---|---|---|---|
| 10,414,517 | B2 | 9/2019 | Wang et al. | |
| 10,875,641 | B2 | 12/2020 | Kovac et al. | |
| 2016/0122038 | A1 | 5/2016 | Fleischman et al. | |
| 2018/0099764 | A1* | 4/2018 | Schill | B64F 1/10 |
| 2019/0202578 | A1 | 7/2019 | Fox et al. | |
| 2022/0234757 | A1* | 7/2022 | Dayan | B64U 70/97 |

FOREIGN PATENT DOCUMENTS

WO WO 2015/182924 A1 12/2015

OTHER PUBLICATIONS

Galimov, Musa et al., "UAV Positioning Mechanisms in Landing Stations: Classification and Engineering Design Review," Jun. 29, 2020, Sensors (Basel).

* cited by examiner

*Primary Examiner* — Kimberly S Berona

*Assistant Examiner* — Steven J Shur

(74) *Attorney, Agent, or Firm* — Haynes and Boone, LLP

(57) ABSTRACT

Systems and methods related to unmanned aerial vehicle (UAV) landing platforms are provided. In one example, a system includes a platform adapted for launching and/or landing a UAV. A plurality of folding elements are pivotably coupled to the support plate to move between closed and open positions, the closed position holding the UAV to the support plate, and the open position allowing the UAV to launch from and/or land on the support plate. One or more motors are configured to move at least one of the plurality of folding elements from the open position to the closed position to align the UAV on the support plate.

20 Claims, 19 Drawing Sheets

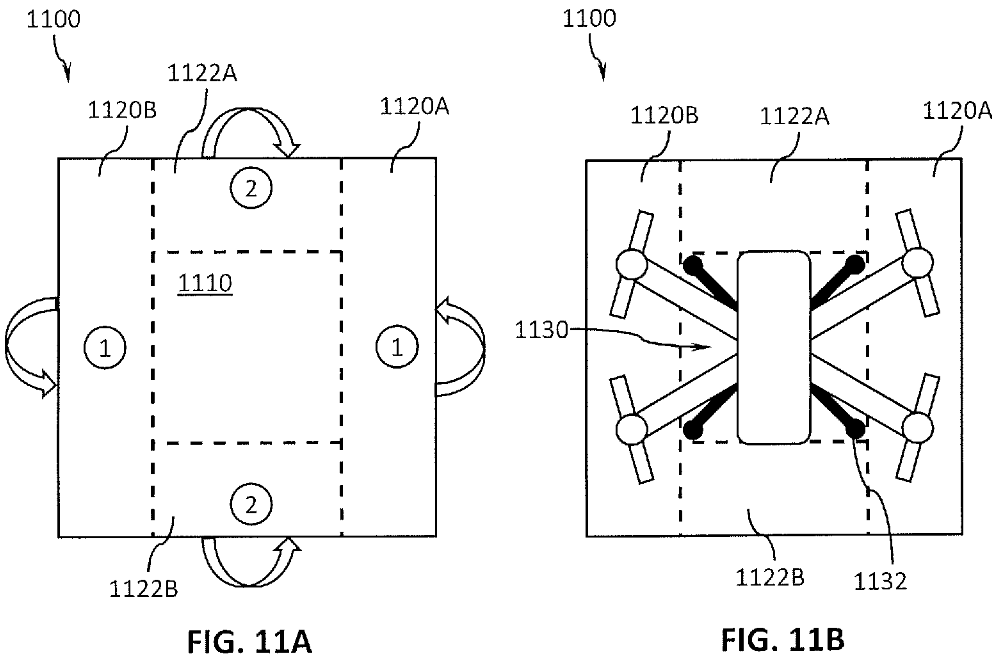
FIG. 11A
FIG. 11B
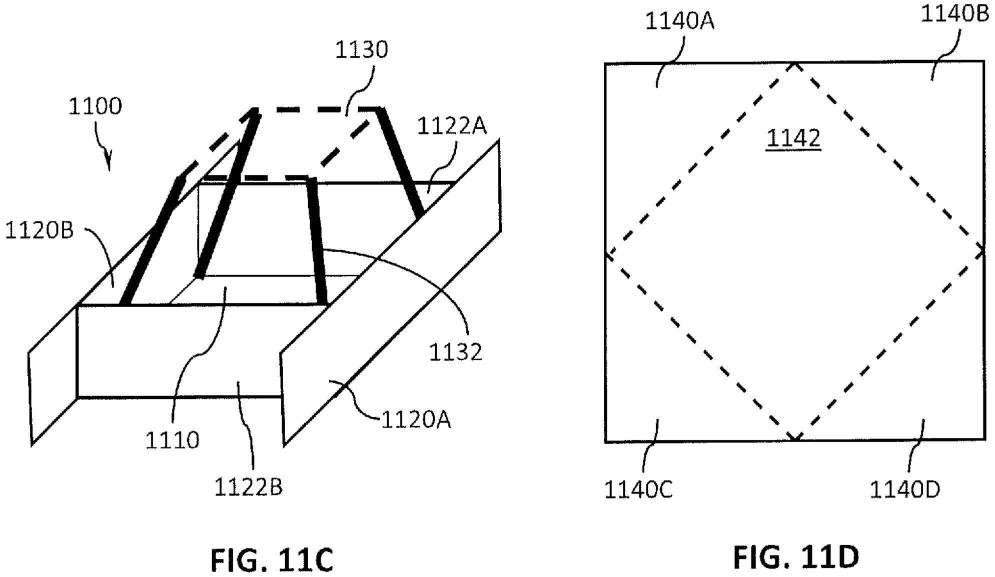
FIG. 11C
FIG. 11D

UNMANNED AERIAL VEHICLE LANDING PLATFORM SYSTEMS AND METHODS

CROSS REFERENCE TO RELATED APPLICATIONS

This application claims priority to and benefit of U.S. Provisional Patent Application No. 63/440,360 filed Jan. 20, 2023 and entitled "UNMANNED AERIAL VEHICLE LANDING PLATFORM SYSTEMS AND METHODS," which is incorporated herein by reference in its entirety.

TECHNICAL FIELD

The present disclosure relates generally to unmanned aerial vehicles and, more particularly, to landing systems and methods for unmanned aerial vehicles.

BACKGROUND

Modern unmanned sensor platforms, such as unmanned aerial vehicles (UAVs), are able to operate over long distances and in various environments (e.g., rural, urban, undeveloped). In particular, UAVs are used to support a wide range of real-world applications including surveillance, reconnaissance, exploration, item transportation, disaster relief, aerial photography, large-scale agriculture monitoring, and other untethered or tethered applications. In conducting various missions, a UAV may have to land and take-off, often from mobile platforms (e.g., from a moving vehicle) and/or from platforms positioned on uneven or off-angle terrain. Landing and takeoff of UAVs may require a level platform, such as a platform that is even/level with the horizon.

In many military and civilian operations, it may be desirable to have personnel remain in positions where they are protected, such as inside a vehicle, away from a UAV landing and launch platform. In such scenarios, launching, landing, and storing a UAV with minimal involvement of personnel is desired. Conditions such as wind and movement of a mobile platform may further complicate landing on a platform.

Thus, there exists a need for UAV landing platform systems and methods that address the deficiencies noted above, other deficiencies known in the industry, or at least offers an alternative to current techniques.

SUMMARY

In one or more embodiments, a system including a platform adapted for launching and/or landing an unmanned aerial vehicle (UAV) is provided. The platform may include a support plate adapted to support the UAV, and one or more motors configured to align the support plate with a horizon based on a detected orientation of the support plate.

In one or more embodiments, a method is provided. The method may include adjusting a platform to a desired angle relative to a horizon, the platform adapted for launching and/or landing a UAV from a vehicle. The platform may include a support plate adapted to support the UAV, and one or more motors configured to align the support plate with a horizon based on a detected orientation of the support plate.

In one or more embodiments, a system including a platform adapted for launching and/or landing UAV is provided. The platform may include a support plate adapted to support the UAV, a plurality of folding elements adapted to fold down to expand the landing surface, and one or more motors configured to adjust the position of one or more of the folding elements to align the UAV on the support plate.

In one or more embodiments, a method includes forming a landing surface for a UAV by operating one or more motors to align a support plate adapted to support the UAV and position the plurality of folding elements to form the landing surface. The method further includes receiving the UAV on the landing surface and controlling the one or more motors to adjust one or more folding elements to align the UAV on the support plate.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 11A, 11B and 11C illustrate an example landing platform, in accordance with one or more embodiments of the present disclosure.

FIG. 11D illustrates an example landing platform, in accordance with one or more embodiments of the present disclosure.

Figure 1A:
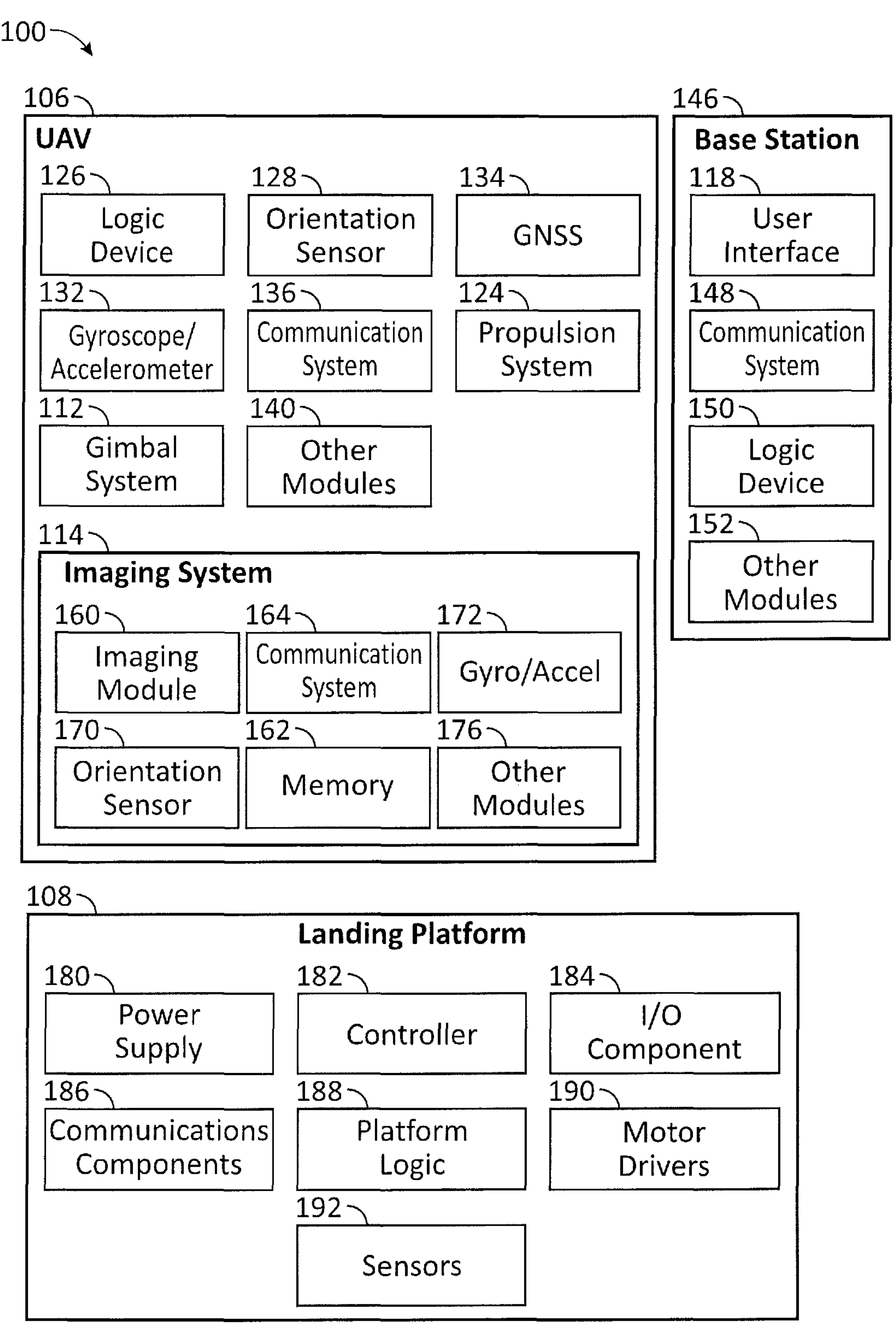
FIG. 1A illustrates a block diagram of a system, in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various systems and methods related to a UAV landing and/or launch platform are provided. In one example, a platform for launching and/or landing a UAV includes a support plate adapted to support the UAV, folding elements adapted to position the UAV on the support plate, and one or more motors configured to align the support plate with a horizon based on a detected orientation of the support plate. In another example, one or more motors are configured to adjust one or more folding elements to align the UAV on the support plate. A system may include the UAV, the platform, and a logic device configured to detect the orientation of the support plate relative to the horizon, and control the one or more motors to align the support plate with the horizon based on the detected orientation of the support plate. A method may include adjusting the platform to a desired angle relative to a horizon. A system may include the UAV, the platform, the folding elements, and a logic device configured to control the one or more motors to adjust one or more folding elements to align the UAV on the platform. A method may include adjusting the folding elements to form an extended landing platform and adjusting the folding elements to position the UAV on the platform.

FIG. 1A illustrates a block diagram of a system 100 including a UAV 106 and a landing platform 108 in accordance with one or more embodiments of the present disclosure. In various embodiments, UAV 106 may be configured to fly over a scene or survey area, to fly through a structure, or to approach a target and image or sense the scene, structure, or target, or portions thereof, such using a gimbal system 112 to aim an imaging system/sensor payload 114 at the scene, structure, or target, or portions thereof, for example. Resulting imagery and/or other sensor data may be processed and displayed to a user through use of a user interface 118 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of UAV 106 and/or sensor payload 114, such as controlling the gimbal system 112 to aim sensor payload 114 towards a particular direction, and/or controlling a propulsion system 124 to move UAV 106 to a desired position in a scene or structure or relative to a target. In some cases, the imagery and/or sensor data may be used to land UAV 106 at a target location or align UAV 106 to interact with the target location, which may be on landing platform 108.

UAV 106 may be implemented as a mobile platform configured to move or fly and position and/or aim the sensor payload 114 (e.g., relative to a designated or detected target). As shown in FIG. 1A, UAV 106 may include one or more of a logic device 126, an orientation sensor 128, a gyroscope/accelerometer 132, a global navigation satellite system (GNSS) 134, a communication system 136, gimbal system 112, propulsion system 124, and other modules 140. Operation of UAV 106 may be substantially autonomous and/or partially or completely controlled by a base station 146, which may include one or more of the following: user interface 118, a communications module 148, a logic device 150, and other modules 152. In other embodiments, UAV 106 may include one or more of the elements of base station 146, such as with various types of manned aircraft, terrestrial vehicles, and/or surface or subsurface watercraft. The sensor payload 114 may be physically coupled to UAV 106 and be configured to capture sensor data (e.g., visible spectrum images, infrared images, narrow aperture radar data, and/or other sensor data) of a target position, area, and/or object(s) as selected and/or framed by operation of UAV 106 and/or base station 146. In some embodiments, one or more of the elements of system 100 may be implemented in a combined housing or structure that can be coupled to or within UAV 106, a vehicle, and/or held or carried by a user of system 100.

Logic device 126 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of UAV 106 and/or other elements of system 100, such as the gimbal system 112, for example. Such software instructions may also implement methods for processing infrared images and/or other sensor signals, determining sensor information, providing user feedback (e.g., through the user interface 118), querying devices for operational parameters, selecting operational parameters for devices, or performing any of the various operations described herein (e.g., operations performed by logic devices of various elements of system 100).

In addition, a non-transitory medium may be provided for storing machine readable instructions for loading into and execution by logic device 126. In these and other embodiments, logic device 126 may be implemented with other components where appropriate, such as volatile memory, non-volatile memory, one or more interfaces, and/or various analog and/or digital components for interfacing with devices of system 100. For example, logic device 126 may be adapted to store sensor signals, sensor information, parameters for coordinate frame transformations, calibration parameters, sets of calibration points, and/or other operational parameters, over time, for example, and provide such stored data to a user using the user interface 118. In some embodiments, logic device 126 may be integrated with one or more other elements of UAV 106, for example, or distributed as multiple logic devices within UAV 106, base station 146, and/or sensor payload 114.

In some embodiments, logic device 126 may be configured to substantially continuously monitor and/or store the status of and/or sensor data provided by one or more elements of UAV 106, sensor payload 114, and/or base station 146, such as the position and/or orientation of UAV 106, sensor payload 114, and/or base station 146, for example. In various embodiments, sensor data may be monitored and/or stored by logic device 126 and/or processed or transmitted between elements of system 100 substantially continuously throughout operation of system 100, where such data includes various types of sensor data (e.g., for blinking pattern detection), control parameters, and/or other data.

The orientation sensor 128 may be implemented as one or more of a compass, float, accelerometer, and/or other device capable of measuring an orientation of UAV 106 (e.g., magnitude and direction of roll, pitch, and/or yaw, relative to one or more reference orientations such as gravity and/or Magnetic North), gimbal system 112, imaging system/sensor payload 114, and/or other elements of system 100, and providing such measurements as sensor signals and/or data that may be communicated to various devices of system 100. In some cases, a yaw and/or position of UAV 106 may be adjusted to better position/orient UAV 106 to align with a target location based on a fiduciary marker associated with the target location. The gyroscope/accelerometer 132 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of UAV 106 and/or other elements of system 100 and providing such measurements as sensor signals and/or data that may be communicated to other devices of system 100 (e.g., user interface 118, logic device 126, logic device 150). The GNSS 134 may be implemented according to any global navigation satellite system, including a GPS, GLONASS, and/or Galileo based receiver and/or other device capable of determining absolute and/or relative position of UAV 106 (e.g., or an element of UAV 106) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, the GNSS 134 may include an altimeter, for example, or may be used to provide an absolute altitude.

The communication system 136 may be implemented as any wired and/or wireless communications module configured to transmit and receive analog and/or digital signals between elements of system 100. For example, the communication system 136 may be configured to receive flight control signals and/or data from base station 146 and provide them to logic device 126 and/or propulsion system 124. In other embodiments, the communication system 136 may be configured to receive images and/or other sensor information (e.g., visible spectrum and/or infrared still images or video images) from the sensor payload 114 and relay the sensor data to logic device 126 and/or base station 146. In some embodiments, the communication system 136 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications. Communication links established by the communication system 136 may be configured to transmit data between elements of system 100 substantially continuously throughout operation of system 100, where such data includes various types of sensor data, control parameters, and/or other data.

The gimbal system 112 may be implemented as an actuated gimbal mount, for example, that may be controlled by logic device 126 to stabilize the sensor payload 114 relative to a target (e.g., a target location) or to aim the sensor payload 114 or components coupled thereto according to a desired direction and/or relative orientation or position. As such, the gimbal system 112 may be configured to provide a relative orientation of the sensor payload 114 (e.g., relative to an orientation of UAV 106) to logic device 126 and/or communication system 136 (e.g., gimbal system 112 may include its own orientation sensor 128). In other embodiments, the gimbal system 112 may be implemented as a gravity driven mount (e.g., non-actuated). In various embodiments, the gimbal system 112 may be configured to provide power, support wired communications, and/or otherwise facilitate operation of articulated the sensor/sensor payload 114. In further embodiments, the gimbal system 112 may be configured to couple to a laser pointer, range finder, and/or other device, for example, to support, stabilize, power, and/or aim multiple devices (e.g., the sensor payload 114 and one or more other devices) substantially simultaneously.

In some embodiments, the gimbal system 112 may be adapted to rotate the sensor payload 114 ±90 degrees, or up to 360 degrees, in a vertical plane relative to an orientation and/or position of UAV 106. In further embodiments, the gimbal system 112 may rotate the sensor payload 114 to be parallel to a longitudinal axis or a lateral axis of UAV 106 as UAV 106 yaws, which may provide 360 degree ranging and/or imaging in a horizontal plane relative to UAV 106. In various embodiments, logic device 126 may be configured to monitor an orientation of gimbal system 112 and/or sensor payload 114 relative to UAV 106, for example, or an absolute or relative orientation of an element of sensor payload 114. Such orientation data may be transmitted to other elements of system 100 for monitoring, storage, or further processing, as described herein.

The propulsion system 124 may be implemented as one or more propellers, rotors, turbines, or other thrust-based propulsion systems, and/or other types of propulsion systems that can be used to provide motive force and/or lift to UAV 106 and/or to steer UAV 106. In some embodiments, the propulsion system 124 may include multiple propellers (e.g., a tri, quad, hex, oct, or other type "copter") that can be controlled (e.g., by logic device 126 and/or the logic device 150) to provide lift and motion for UAV 106 and to provide an orientation for UAV 106. In other embodiments, the propulsion system 124 may be configured primarily to provide thrust while other structures of UAV 106 provide lift, such as in a fixed wing embodiment (e.g., where wings provide the lift) and/or an aerostat embodiment (e.g., balloons, airships, hybrid aerostats). In various embodiments, the propulsion system 124 may be implemented with a portable power supply, such as a battery and/or a combustion engine/generator and fuel supply.

Other modules 140 may include other and/or additional sensors, actuators, communications modules/nodes, and/or user interface devices, for example, and may be used to provide additional environmental information related to operation of UAV 106, for example. In some embodiments, other modules 140 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., logic device 126) to provide operational control of UAV 106 and/or system 100.

In some embodiments, other modules 140 may include one or more actuated and/or articulated devices (e.g., light emitting devices (e.g., light emitting diodes), multi-spectrum active illuminators, visible and/or IR cameras, radars, sonars, and/or other actuated devices) coupled to UAV 106, where each actuated device includes one or more actuators adapted to adjust an orientation of the device, relative to UAV 106, in response to one or more control signals (e.g., provided by logic device 126). In particular, other modules 140 may include a stereo vision system configured to provide image data that may be used to calculate or estimate a position of UAV 106, for example, or to calculate or estimate a relative position of a navigational hazard in proximity to UAV 106. In various embodiments, logic device 126 may be configured to use such proximity and/or position information to help safely pilot UAV 106 and/or monitor communication link quality, as described herein.

The user interface 118 of base station 146 may be implemented as one or more of a display, a touch screen, a keyboard, a mouse, a joystick, a knob, a steering wheel, a yoke, and/or any other device capable of accepting user input and/or providing feedback to a user. In various embodiments, the user interface 118 may be adapted to provide user input (e.g., as a type of signal and/or sensor information transmitted by the communication system 148 of base station 146) to other devices of system 100, such as the logic device 126. The user interface 118 may also be implemented with logic device 150 (e.g., similar to logic device 126), which may be adapted to store and/or execute instructions, such as software instructions, implementing any of the various processes and/or methods described herein. For example, the user interface 118 may be adapted to form communication links and transmit and/or receive communications (e.g., infrared images and/or other sensor signals, control signals, sensor information, user input, and/or other information), for example, or to perform various other processes and/or methods described herein (e.g., via logic device 150).

In one embodiment, the user interface 118 may be adapted to display a time series of various sensor information and/or other parameters as part of or overlaid on a graph or map, which may be referenced to a position and/or orientation of UAV 106 and/or other elements of system 100. For example, the user interface 118 may be adapted to display a time series of positions, headings, and/or orientations of UAV 106 and/or other elements of system 100 overlaid on a geographical map, which may include one or more graphs indicating a corresponding time series of actuator control signals, sensor information, and/or other sensor and/or control signals.

In some embodiments, the user interface 118 may be adapted to accept user input including a user-defined target heading, waypoint, route, and/or orientation for an element of system 100, for example, and to generate control signals to cause UAV 106 to move according to the target heading, route, and/or orientation, or to aim the sensor payload 114 accordingly. In other embodiments, the user interface 118 may be adapted to accept user input modifying a control loop parameter of logic device 126, for example. In further embodiments, the user interface 118 may be adapted to accept user input including a user-defined target attitude, orientation, and/or position for an actuated or articulated device (e.g., the sensor payload 114) associated with UAV 106, for example, and to generate control signals for adjusting an orientation and/or position of the actuated device according to the target altitude, orientation, and/or position. Such control signals may be transmitted to logic device 126 (e.g., using the communication system 148 and 136), which may then control UAV 106 accordingly.

The communication system 148 may be implemented as any wired and/or wireless communications module configured to transmit and receive analog and/or digital signals between elements of system 100. For example, the communication system 148 may be configured to transmit flight control signals from the user interface 118 to communication system 136 or 164. In other embodiments, the communication system 148 may be configured to receive sensor data (e.g., visible spectrum and/or infrared still images or video images, or other sensor data) from the sensor payload 114. In some embodiments, the communication system 148 may be configured to support spread spectrum transmissions, for example, and/or multiple simultaneous communications channels between elements of system 100. In various embodiments, the communication system 148 may be configured to monitor the status of a communication link established between base station 146, the sensor payload 114, and/or UAV 106 (e.g., including packet loss of transmitted and received data between elements of system 100, such as with digital communication links), as described herein. Such status information may be provided to the user interface 118, for example, or transmitted to other elements of system 100 for monitoring, storage, or further processing.

Other modules 152 of base station 146 may include other and/or additional sensors, actuators, communications modules/nodes, and/or user interface devices used to provide additional environmental information associated with base station 146, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., logic device 126) to provide operational control of UAV 106 and/or system 100 or to process sensor data to compensate for environmental conditions, such as an water content in the atmosphere approximately at the same altitude and/or within the same area as UAV 106 and/or base station 146, for example. In some embodiments, other modules 152 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by the user interface 118).

In embodiments where the imaging system/sensor payload 114 is implemented as an imaging device, the imaging system/sensor payload 114 may include an imaging module 160, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, the imaging module 160 may include one or more logic devices (e.g., similar to logic device 126) that can be configured to process imagery captured by detector elements of the imaging module 160 before providing the imagery to a memory 162 or a communication system 164. More generally, the imaging module 160 may be configured to perform any of the operations or methods described herein, at least in part, or in combination with logic device 126 and/or user interface 118.

In some embodiments, the sensor payload 114 may be implemented with a second or additional imaging modules similar to the imaging module 160, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to the imaging module 160 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

The communication system 164 of the sensor payload 114 may be implemented as any wired and/or wireless communications module configured to transmit and receive analog and/or digital signals between elements of system 100. For example, the communication system 164 may be configured to transmit infrared images from the imaging module 160 to communication system 136 or 148. In other embodiments, the communication system 164 may be configured to receive control signals (e.g., control signals directing capture, focus, selective filtering, and/or other operation of sensor payload 114) from logic device 126 and/or user interface 118. In some embodiments, communication system 164 may be configured to support spread spectrum transmissions, for example, and/or multiple simultaneous communications channels between elements of system 100. In various embodiments, the communication system 164 may be configured to monitor and communicate the status of an orientation of the sensor payload 114 as described herein. Such status information may be provided or transmitted to other elements of system 100 for monitoring, storage, or further processing.

The memory 162 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. The memory 162 may also be implemented, at least in part, as removable memory, such as a secure digital memory card for example including an interface for such memory.

An orientation sensor 170 of the sensor payload 114 may be implemented similar to the orientation sensor 128 or gyroscope/accelerometer 132, and/or any other device capable of measuring an orientation of the sensor payload 114, the imaging module 160, and/or other elements of the sensor payload 114 (e.g., magnitude and direction of roll, pitch, and/or yaw, relative to one or more reference orientations such as gravity, Magnetic North, and/or an orientation of UAV 106) and providing such measurements as sensor signals that may be communicated to various devices of system 100. A gyroscope/accelerometer (e.g., angular motion sensor) 172 of the sensor payload 114 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of the sensor payload 114 and/or various elements of the sensor payload 114 and providing such measurements as sensor signals that may be communicated to various devices of system 100.

Other modules 176 of the sensor payload 114 may include other and/or additional sensors, actuators, communications modules/nodes, cooled or uncooled optical filters, and/or user interface devices used to provide additional environmental information associated with the sensor payload 114, for example. In some embodiments, other modules 176 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by the imaging module 160 or other devices of system 100 (e.g., logic device 126) to provide operational control of UAV 106 and/or system 100 or to process imagery to compensate for environmental conditions.

With continued reference to FIG. 1A, landing platform 108 may include various components to facilitate the operation of landing platform 108, including communications (e.g., with UAV 106 and/or base station 146, etc.), controlling various components and tests, and receiving and processing sensor data. In embodiments, landing platform 108 includes a power supply 180, a controller 182, an input/output (I/O) component 184, communications components 186, platform logic 188, one or more motor drivers 190, and one or more sensors 192, or any combination thereof.

Power supply 180 may be any power supply suitable to power landing platform 108 or components thereof. For instance, power supply 180 may include one or more batteries or other power supply components. In embodiments, landing platform 108 may be plugged into a power outlet or hardwired to a facility's electrical system or to a vehicle's electrical system to charge the batteries and/or power landing platform 108.

Controller 182 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), or other processing devices used to control the operations of landing platform 108.

I/O component 184 may process user action, such as selecting keys from a keypad/keyboard and/or selecting one or more buttons, images, or links, such as for inputting or accessing/requesting data, and sends a corresponding signal to controller 182. I/O component 184 may also include an output component, such as a display control and a cursor control (such as a keyboard, keypad, mouse, etc.). I/O component 184 may include an optional audio/visual component to allow a user to use voice for inputting information by converting audio signals and/or input or record images/videos by capturing visual data. I/O component 184 may allow the user to hear audio and view images/video.

Communications components 186 may include wired and/or wireless interfaces. Wired interfaces may include communications links with various platform components and may be implemented as one or more physical networks or device connect interfaces (e.g., Ethernet, and/or other protocols). Wireless interfaces may be implemented as one or more Wi-Fi, Bluetooth, cellular, infrared, radio, and/or other types of network interfaces for wireless communications and may facilitate communications with wireless devices of landing platform 108, UAV 106, base station 146, and/or other component or system.

Platform logic 188 may be implemented as circuitry and/or a machine-readable medium storing various machine-readable instructions and data. For example, in some embodiments, platform logic 188 may store an operating system and one or more applications as machine readable instructions that may be read and executed by controller 182 to perform various operations described herein. In some embodiments, platform logic 188 may be implemented as non-volatile memory (e.g., flash memory, hard drive, solid state drive, or other non-transitory machine-readable mediums), volatile memory, or combinations thereof. Platform logic 188 may include status, configuration and control features which may include various control features disclosed herein. In some embodiments, platform logic 188 executes one or more tests or calibrations to be performed on landing platform 108, as described above. Status information of the tests, calibration specific values, and other information may be displayed to the user during production.

The one or more motor drivers 190 may control one or more motors of landing platform 108, such as an actuator or motor to control movement of various components of landing platform 108, as described herein. The one or more sensors 192 may include sensors for detecting calibration values, platform position, etc.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100. In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. Each element of system 100 may include one or more batteries, capacitors, or other electrical power storage devices, for example, and may include one or more solar cell modules or other electrical power generating devices. In some embodiments, one or more of the devices may be powered by a power source for UAV 106, using one or more power leads. Such power leads may also be used to support one or more communication techniques between elements of system 100.

Figure 1B:
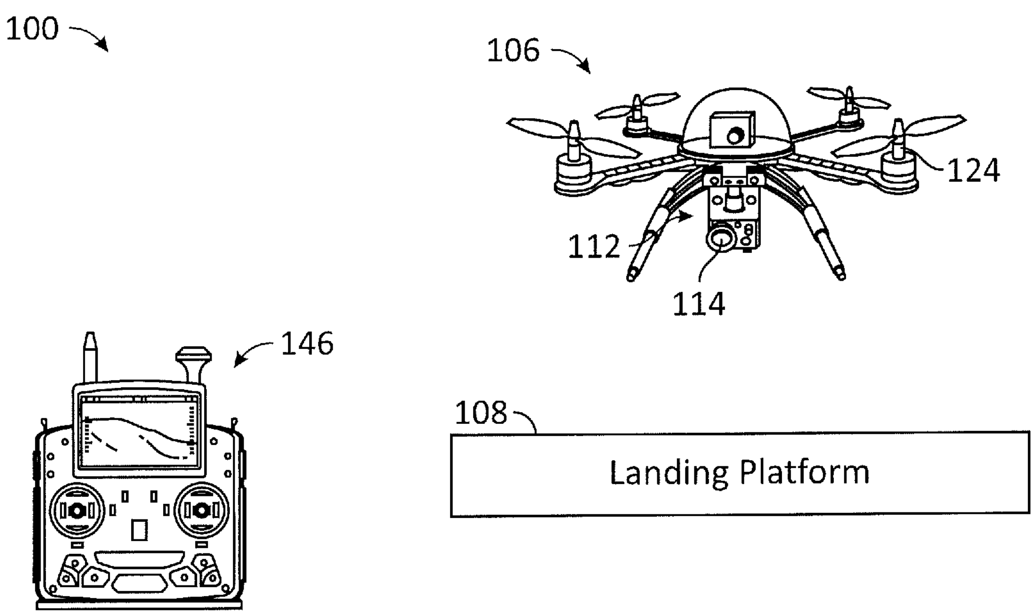
FIG. 1B illustrates a diagram of the system of FIG. 1A, in accordance with one or more embodiments of the present disclosure.

FIG. 1B illustrates a diagram of system 100 in accordance with one or more embodiments of the present disclosure. In some embodiments, base station 146 may be configured to control motion, position, and/or orientation of UAV 106 and/or sensor payloads 114. Further, base station 146 may be configured to control operation of landing platform 108 in some embodiments. In various embodiments, UAV 106 may be configured to control an operation of landing platform 108 such that UAV 106 may automate a landing procedure as discussed herein. Generally, system 100 may include any number of UAVs, landing platforms, and base stations.

Figure 2:
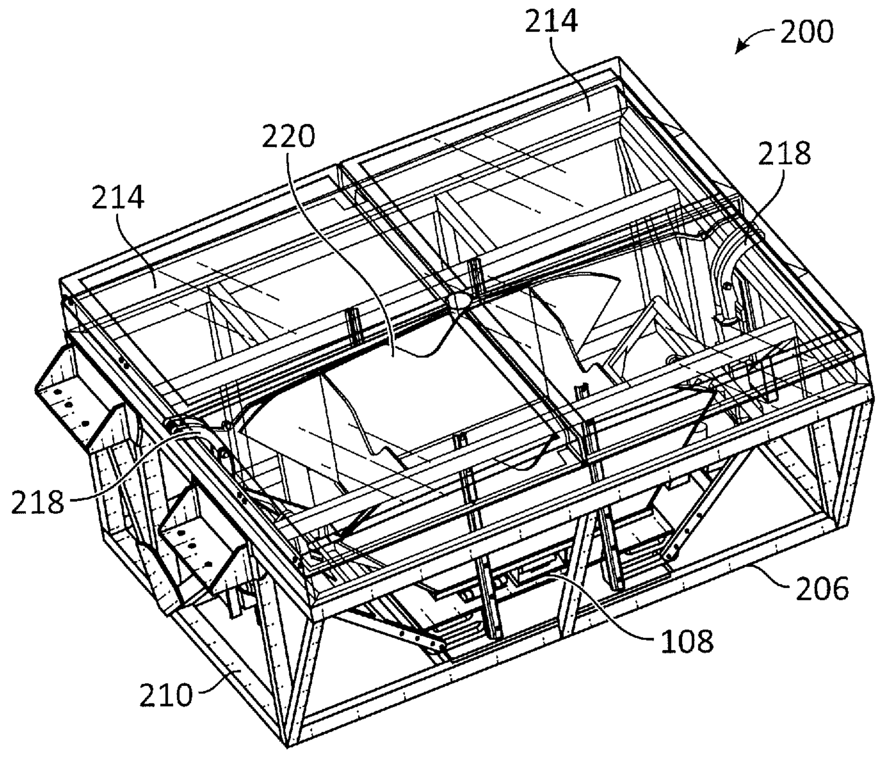
FIG. 2 illustrates a landing platform in a closed configuration, with portions of the platform shown transparent for illustration purposes, in accordance with one or more embodiments of the present disclosure.
Figure 3:
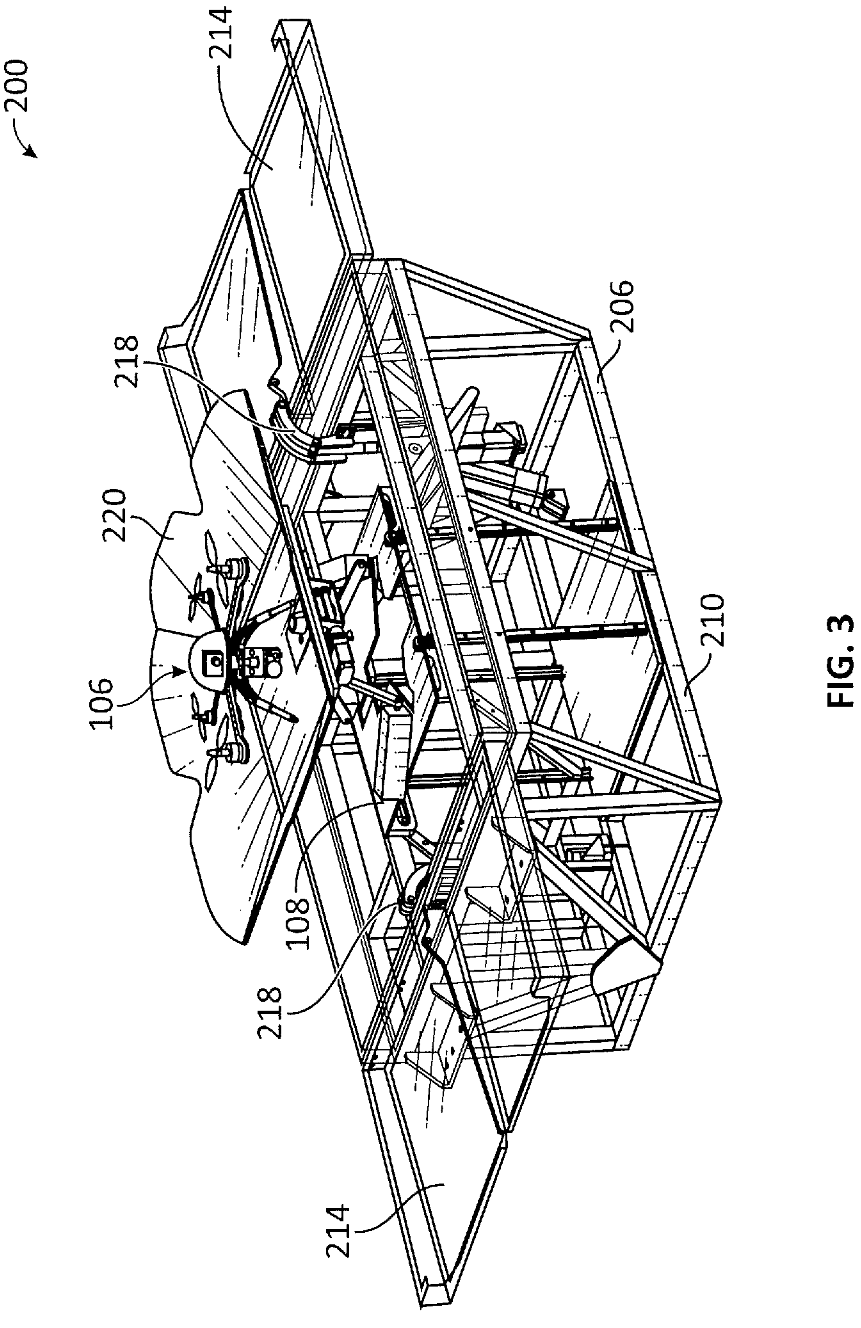
FIG. 3 illustrates the landing platform in an open configuration, with portions of the platform shown transparent for illustration purposes, in accordance with one or more embodiments of the present disclosure.
Figure 4:
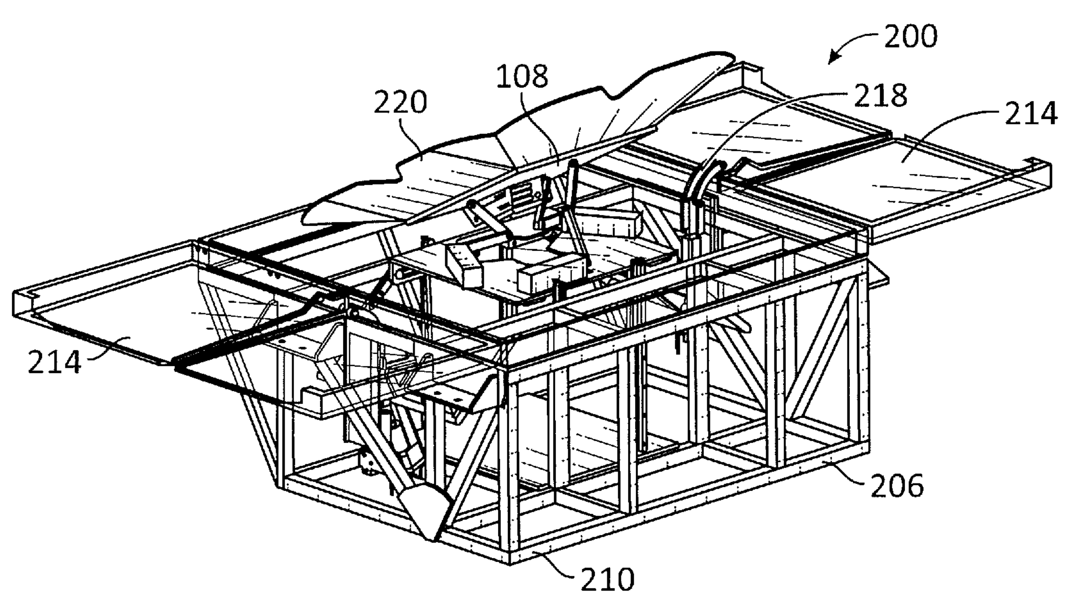
FIG. 4 illustrates the landing platform in the open configuration and angled to compensate for an off-angle orientation of the system, in accordance with one or more embodiments of the present disclosure.

FIG. 2 illustrates a UAV landing/launch system 200 in a closed configuration, with portions of system 200 shown transparent for illustration purposes, in accordance with one or more embodiments of the present disclosure. FIG. 3 illustrates system 200 in an open configuration, with portions of system 200 shown transparent for illustration purposes, in accordance with one or more embodiments of the present disclosure. FIG. 4 illustrates system 200 in the open configuration and adapted to compensate for an off-angle orientation of the system 200, in accordance with one or more embodiments of the present disclosure. Referring to FIGS. 2-4, UAV 106 may be raised and lowered out of a container 206, the container 206 adapted to store UAV 106 between missions and/or protect UAV 106 from the environment. For example, landing platform 108 may be secured within container 206. As detailed more fully below, at least a portion of landing platform 108 may be raisable from container 206 to a launch position via a lift mechanism. As illustrated in FIG. 4, system 200 may allow landing platform 108 to be manipulated at any angle to keep landing platform 108 at a desired orientation, such as at an orientation required for UAV 106 to launch/land. Such embodiments may compensate for off-angle orientations of container 206, such as in embodiments where container 206 is mounted to a vehicle, such as a ground-based vehicle (e.g., automobile or truck), a watercraft, an aircraft/spacecraft, or other vehicle.

As illustrated in FIGS. 2-4, container 206 may include a frame 210 and one or more doors 214. For illustration purposes, doors 214 are illustrated transparent to illustrate other features of system 200. Frame 210 may provide a support structure to mount landing platform 108 within container 206 and/or mount container 206 (e.g., to a vehicle). As illustrated in FIG. 2, the one or more doors 214 may be closed to, for example, secure landing platform 108 in container 206 and/or protect landing platform 108 from the environment. As illustrated in FIGS. 2-3, the one or more doors 214 may be opened to, for example, allow raising of landing platform 108 to a launch position. In embodiments, raising landing platform 108 may cause door(s) 214 to automatically open, such as via an arm 218 securing door(s) 214 to landing platform 108. Lowering landing platform 108 into container 206 may cause door(s) 214 to automatically close, such as via arm 218.

Referring to FIG. 2, landing platform 108 may be configurable to allow platform storage of landing platform 108 within container 206. For example, landing platform 108 may include one or more folding sections or elements 220 allowing landing platform 108 to fold up into a smaller size to be stowed in container 206. Referring to FIGS. 3-4, the folding elements 220 may be unfolded when landing platform 108 is raised from container 206, such as to provide a larger landing platform for UAV 106. In embodiments, folding elements 220 may be adapted to position UAV 106 on landing platform 108. For example, at least a portion of folding elements 220, when in a closed position, may be adapted to trap on a feature of UAV 106 to hold UAV 106 in place.

Folding elements 220 are illustrative only, and any reference to folding or unfolding is for convenience only and should not be construed as a required feature unless otherwise claimed. For example, landing platform 108 may include other configurations, including articulating or moving elements that selectively collapse or close to engage UAV 106 and/or fit landing platform 108 within container 206, and selectively expand or open to facilitate UAV take-off and/or landing. For instance, and without limitation, landing platform 108 may include an articulating stage without any folding features.

FIGS. 5-9 illustrate various views of landing platform 108 with container 206 removed for illustration purposes, in accordance with one or more embodiments of the present disclosure. As shown, landing platform 108 includes a support plate 502 adapted to support UAV 106, folding elements 220 (e.g., adapted to position UAV 106 on support plate 502), and one or more motors 506. Support plate 502 may be a flat plate providing a landing surface for UAV 106. Folding elements 220 may be pivotably coupled to support plate 502 to move between closed and open positions. The closed position of folding elements 220 (see FIGS. 5-6) may secure UAV 106. For example, at least a portion of folding elements 220, when in the closed position, may be adapted to trap on a feature of UAV 106 to hold UAV 106 in place on support plate 502. The open position of folding elements 220 (see FIGS. 7-9) may allow UAV 106 to launch from and/or land on support plate 502. For example, when opened, folding elements 220 may clear UAV 106.

Figure 7:
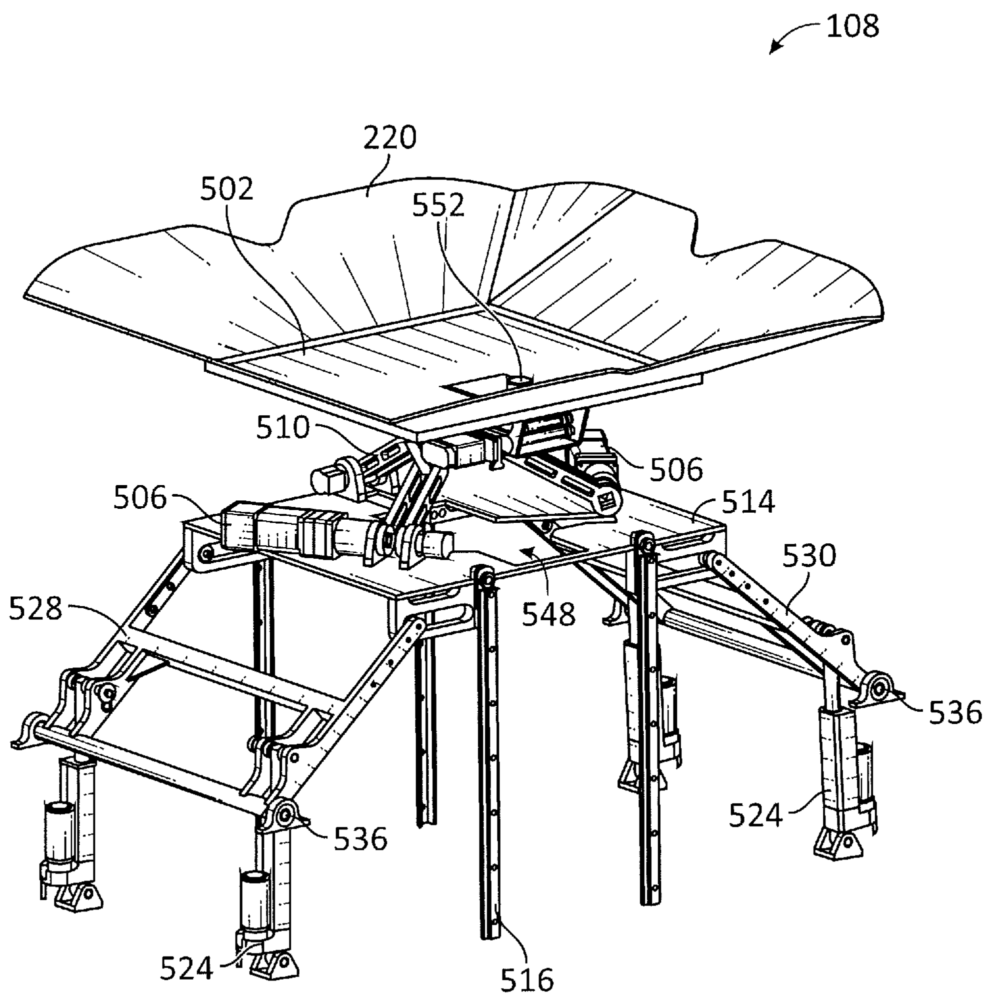
FIG. 7 illustrates the landing platform of FIG. 5 in the launch position and platform sections deployed, in accordance with one or more embodiments of the present disclosure.
Figure 8:
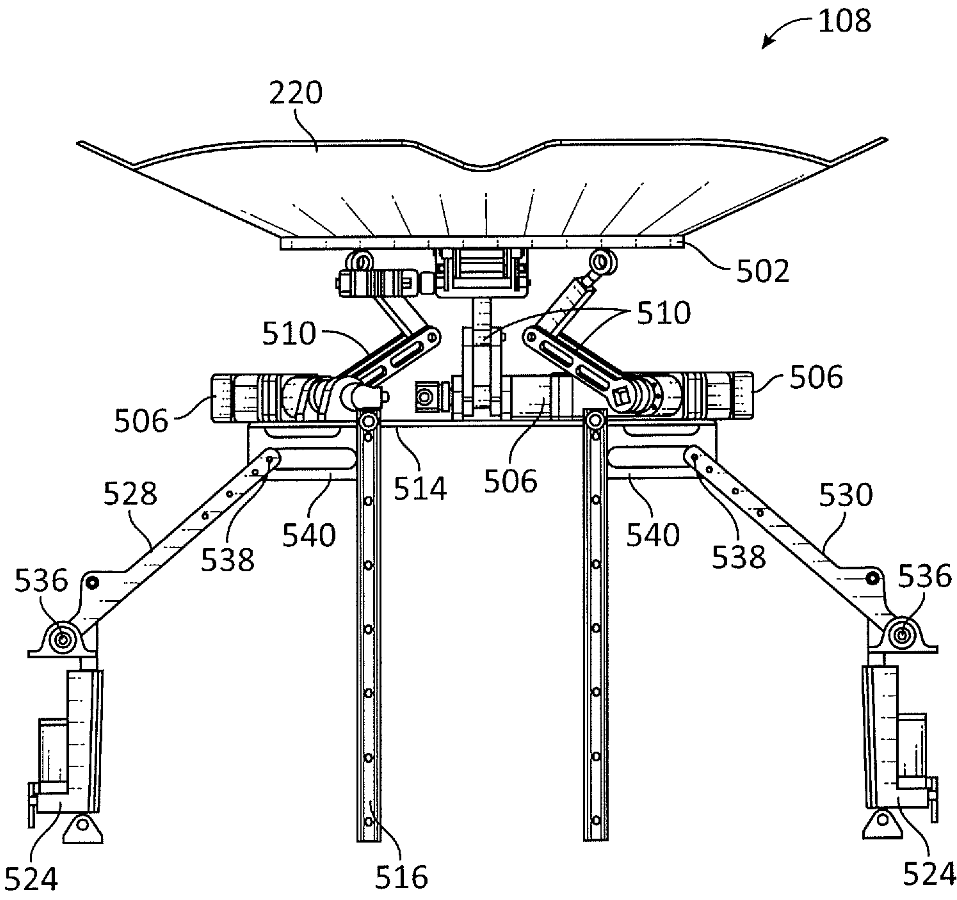
FIG. 8 illustrates a side view of the landing platform of FIG. 7, in accordance with one or more embodiments of the present disclosure.
Figure 9:
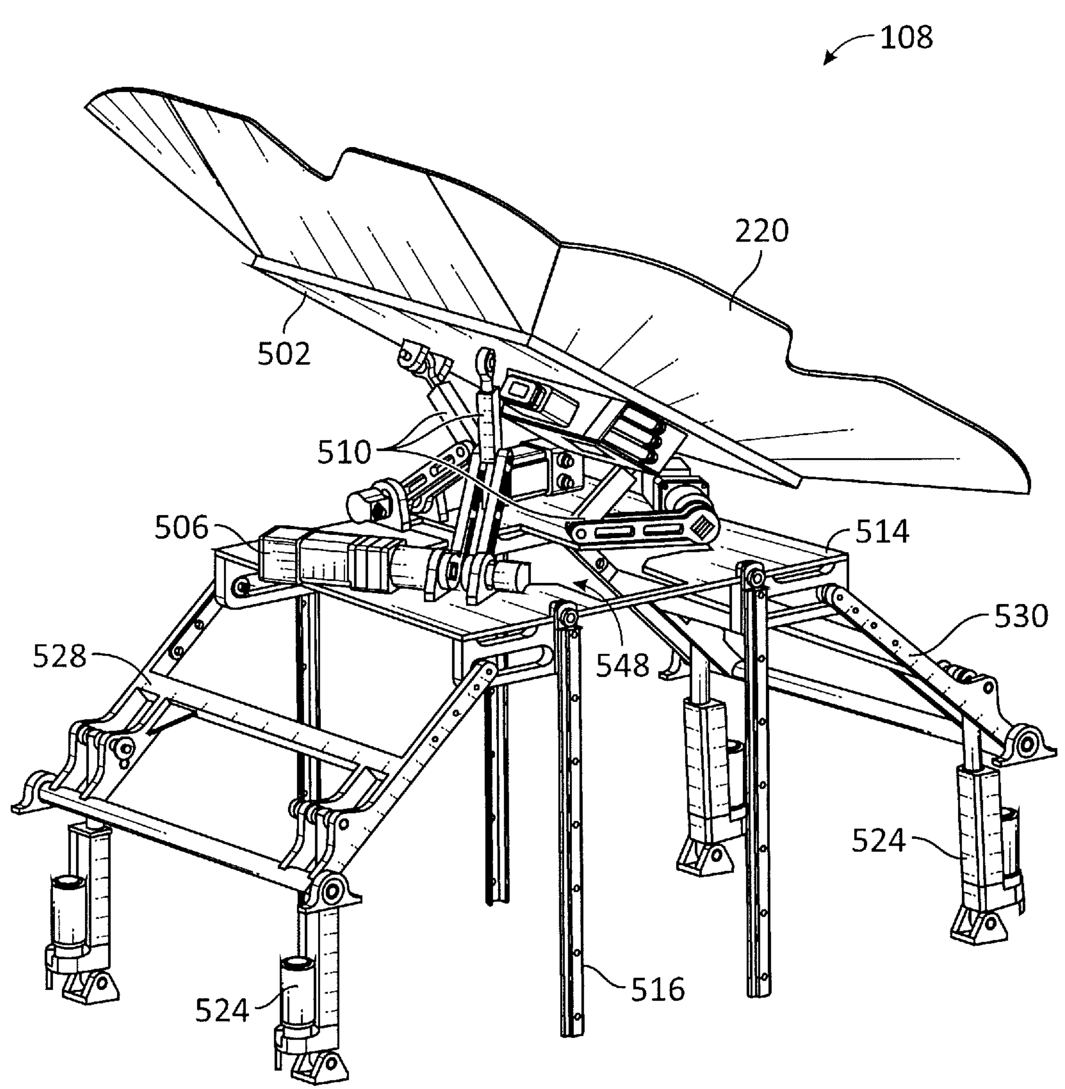
FIG. 9 illustrates the landing platform of FIG. 7 angled to compensate for an off-angle orientation of the system, in accordance with one or more embodiments of the present disclosure.

The one or more motors 506 may be configured to align support plate 502 at a desired orientation. For example, the one or more motors 506 may be configured to align support plate 502 with a horizon based on a detected orientation of support plate 502. For example, motor(s) 506 may align support plate 502 even with the horizon to account for off-angle mounting and/or positioning of container 206/landing platform 108. Such embodiments may allow proper positioning of support plate 502 when an associated vehicle is oriented off-angle, which may include a vehicle of any type being off-angle with respect to the horizon whether on land (e.g., a ground vehicle on uneven or off-angle terrain), in the water (e.g., a listing boat), and/or in the air/space (e.g., an airplane due to roll and/or pitch angles), for instance. Depending on the application, landing platform 108 may include a plurality of motors 506 (e.g., three motors 506), although other configurations are contemplated. As illustrated in FIGS. 7-9, an articulating arm assembly 510 may couple each motor of the one or more motors 506 to support plate 502 to facilitate angular positioning of support plate 502 by motors 506.

As illustrated in FIGS. 5-9, landing platform 108 may include a base plate 514. The one or more motors 506 may be mounted to base plate 514 to control a position of support plate 502 relative to base plate 514. As shown, base plate 514 may be slidably coupled to a linear track 516. Linear track 516 may be defined by one or more track elements 518 (e.g., four track elements 518) limiting movement of base plate 514 to along a single axis (e.g., a vertical axis relative to container 206 to raise/lower landing platform 108 in container 206). Base plate 514 may be coupled to linear track 516 by a linear bearing or a carriage bearing. Linear track 516 (e.g., track elements 518) may be mounted to container 206. In another examples, the one or more motors may be configured to drive two or more threaded rods, thus enabling control over unwanted lateral movement of the base plate, the one or more motors may be configured to drive a scissor lift or similar apparatus having cross-balance supports, and/or the one or more motors may be configured to operate another assembly configured to adjust the base plate as described herein.

In embodiments, landing platform 108 may include one or more actuators 524 configured to slide base plate 514 along linear track 516. For example, one end of each actuator may be secured to container 206 (e.g., to frame 210 via a mounting block) and the opposing, actuating end of each actuator may be coupled to base plate 514 (either directly or via one or more elements). In embodiments, a first lift arm 528 may couple a first set of actuators (e.g., a first pair of actuators 524) to base plate 514, and a second lift arm 530 may couple a second set of actuators (e.g., a second pair of actuators 524) to base plate 514. A first end 534 of each of first lift arm 528 and second lift arm 530 may be secured to container 206 (e.g., to frame 210 via a mount 536) and an opposing second end 538 of first lift arm 528 and second lift arm 530 may be coupled to base plate 514 (e.g., via a carriage 540). Each actuator 524 may be a linear actuator, although other configurations are contemplated.

Landing platform 108 may include other features. For example, landing platform 108 may include a tether system 550 including a tether guide 552. Tether system 550 may facilitate tethered flight of UAV 106, with tether guide 552 facilitating extension/retraction of a tether connected to UAV 106. In embodiments, landing platform 108 may include one or more sensors configured to detect an orientation of support plate 502 (e.g., relative to the horizon). In embodiments, landing platform 108 may include a control system (e.g., controller 182) configured to control operation of landing platform 108. For example, controller 182 may detect the orientation of support plate 502 and control the one or more motors 506 to align support plate 502 (e.g., with the horizon) based on the detected orientation of support plate 502.

Figure 5:
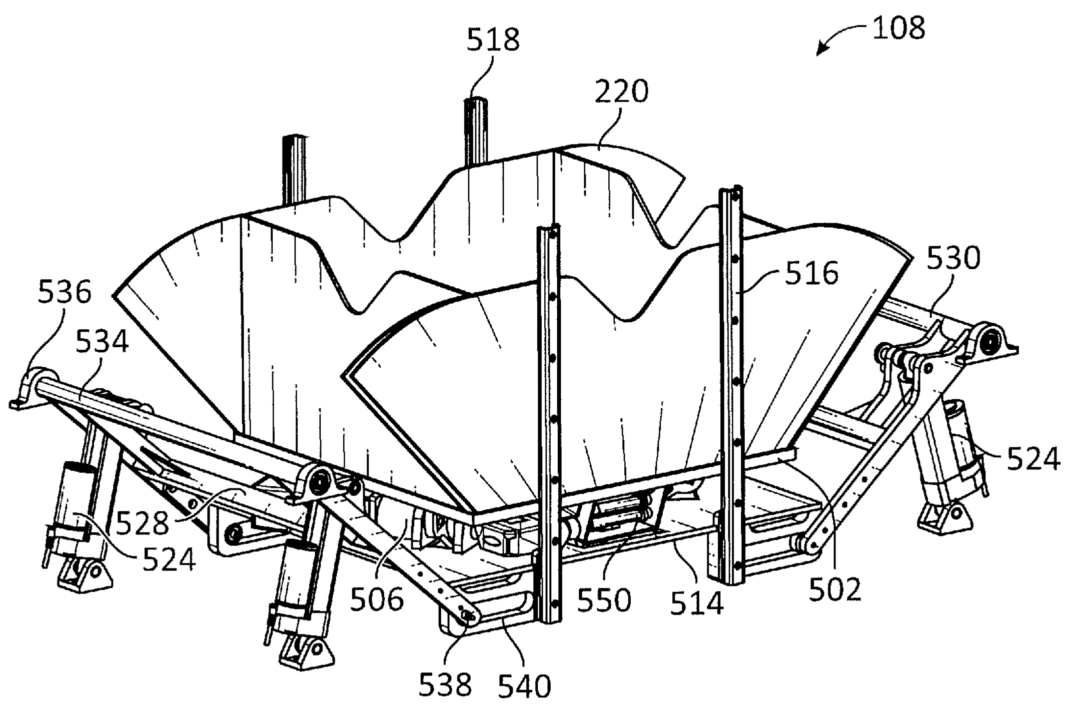
FIG. 5 illustrates the landing platform in a stowed position, with portions of the platform removed for illustration purposes, in accordance with one or more embodiments of the present disclosure.

With continued reference to FIGS. 5-9, operation of landing platform 108 will now be discussed. As disclosed herein, landing platform 108 may be secured within container 206 and movable between a stowed position and a launch position via a lift mechanism. FIG. 5 illustrates landing platform 108 in the stowed position, in accordance with one or more embodiments of the present disclosure. As illustrated, actuators 524 may be collapsed such that base plate 514 is in a lowered position (e.g., a lowermost vertical position within container 206). For example, first lift arm 528 and second lift arm 530 may be positioned via retraction or collapsing of actuators 524 to lower second end 538 of first lift arm 528 and second lift arm 530 adjacent a bottom of container 206. Actuators 524 may be collapsed or retracted evenly to maintain a level position of base plate 514, such as parallel to the bottom of container 206 and/or perpendicular to linear track 516 to limit binding. Motors 506 may be actuated to collapse support plate 502 to a lowered position (e.g., a lowermost position near base plate 514). For example, motors 506 may be actuated to collapse (e.g., fully collapse) each articulating arm assembly 510. In embodiments, base plate 514 may include one or more cutouts 548 to accommodate articulating arm assemblies 510 in the lowermost position. Support plate 502 may extend parallel to base plate 514 in the stowed position. As shown, folding elements 220 may be folded or otherwise collapsed to allow positioning of landing platform 108 in container 206. Folding or collapsing of folding elements 220 may secure UAV 106 to landing platform 108, such as a portion of folding elements 220 trapping or engaging a portion of UAV 106. In some embodiments, the folding elements 220 are controlled through one or more dedicated mechanisms as described further herein with respect to the embodiments of FIGS. 10-13.

Figure 6:
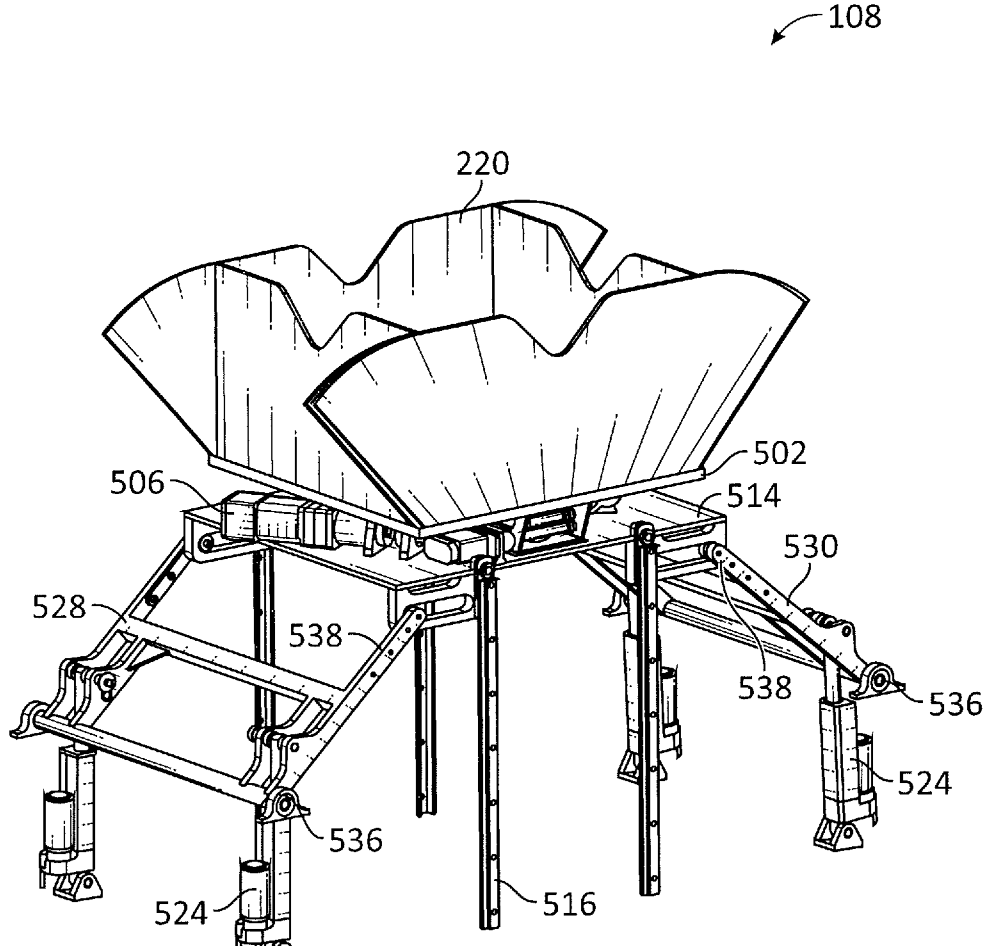
FIG. 6 illustrates the landing platform of FIG. 5 raised to a launch position, in accordance with one or more embodiments of the present disclosure.

FIG. 6 illustrates landing platform 108 raised to the launch position with folding elements 220 collapsed/folded, in accordance with one or more embodiments of the present disclosure. As illustrated, actuators 524 may be extended to raise base plate 514 to a raised position (e.g., an uppermost vertical position within container 206). For example, first lift arm 528 and second lift arm 530 may be positioned via extension of actuators 524 to raise second end 538 of first lift arm 528 and second lift arm 530 (e.g., via rotation of first lift arm 528 and second lift arm 530 about mount 536). Actuators 524 may be extended evenly to maintain level position of base plate 514 (e.g., to limit binding of base plate 514 along linear track 516). Raising base plate 514 via actuators 524 may cause base plate 514 to slide along linear track 516 and second end 538 of first lift arm 528/second lift arm 530 to slide along carriage 540.

FIGS. 7-8 illustrate landing platform 108 raised to the launch position with folding elements 220 deployed/unfolded, in accordance with one or more embodiments of the present disclosure. As illustrated, movement of landing platform 108 from the stowed position to the launch position may deploy folding elements 220 from the closed position to the open position. Similarly, movement of landing platform 108 from the launch position to the stowed position may collapse the folding elements 220 from the open position to the closed position. For instance, motors 506 may be actuated to raise support plate 502 away from base plate 514 (e.g., to a raised position). In embodiments, motors 506 may be actuated to articulate one or more articulating arm assemblies 510 to cause movement of support plate 502 relative to base plate 514. As shown, motors 506 may be actuated evenly to raise support plate 502 parallel to base plate 514. Raising of base plate 514 and/or raising of support plate 502 relative to base plate 514 may deploy folding elements 220, such as automatically, as folding elements 220 clear container 206/doors 214. Conversely, lowering of base plate 514 and/or lowering of support plate 502 towards base plate 514 may collapse folding elements 220, such as automatically. In other embodiments, the folding elements 220 may be deployed/collapsed using one or more motors and assemblies as described, for example, in the embodiments illustrated in FIGS. 10-13. In such embodiments, the timing and actuation of the individual motors may be controlled by the controller 182 to deploy/collapse the folding elements 220 during and/or after the raising/lowering of the base plate 514 and/or support plate 502.

FIG. 9 illustrates landing platform 108 raised to the launch position, folding elements 220 deployed, and support plate 502 angled relative to base plate 514, in accordance with one or more embodiments of the present disclosure. As illustrated, motors 506 may be actuated unevenly to position support plate 502 at a non-parallel angle to base plate 514. In this manner, support plate 502 may be manipulated to substantially any mechanically-allowable angle to position support plate 502 at a desired orientation. Such embodiments may be useful to compensate for off-angle orientations of container 206/landing platform 108. For example, mounting container 206 on a vehicle may cause container 206 to be positioned off-angle relative to the horizon, such as due to the mounting itself or positioning of vehicle with respect to the horizon (e.g., a ground-based vehicle on uneven or off-angle terrain, a water/air/space vehicle oriented off-angle relative to the horizon, etc.). In such embodiments, support plate 502 may be angled relative to base plate

514 via motors 506 and articulating arm assemblies 510 to maintain a level or near-level alignment of support plate 502 with the horizon.

Lowering landing platform 108 from the launch position to the stowed position may be accomplished via a reverse order of operations. For example, motors 506 may be actuated to collapse support plate 502 to base plate 514, and actuators 524 may be actuated to lower base plate 514 along linear track 516 and into container 206. Collapsing support plate 502 to base plate 514 and/or lowering of base plate 514 into container 206 may collapse folding elements 220, such as automatically as folding elements 220 engage container 206/doors 214. As noted above, lowering of landing platform 108 into container 206 may cause doors 214 to close, such as via arm 218. Alternatively, one or more actuators/motors may open or close doors 214 based on position of landing platform 108 and/or an executable control.

Figure 10:
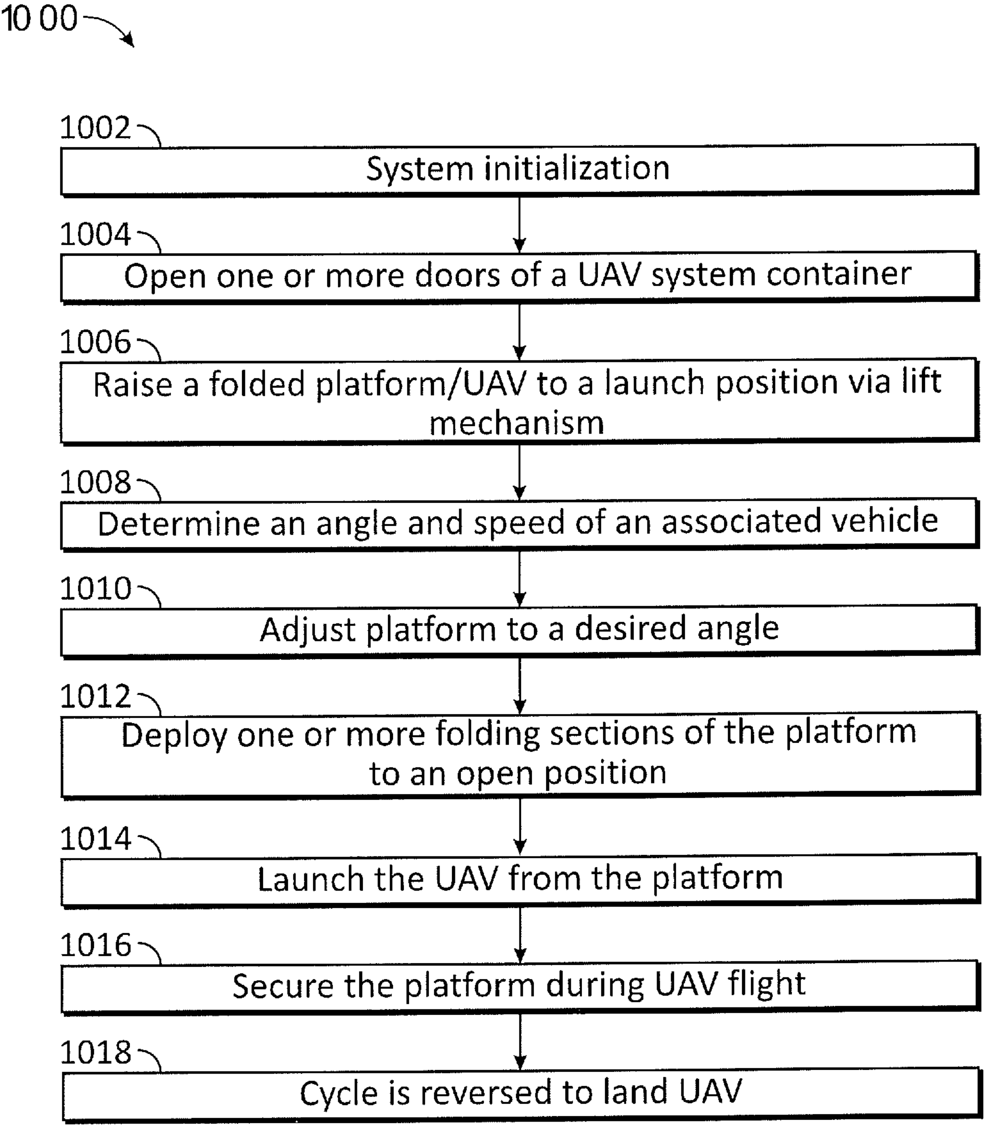
FIG. 10 illustrates a flow diagram of a process for positioning a UAV landing platform, in accordance with one or more embodiments of the present disclosure.

FIG. 10 illustrates a flow diagram of a process 1000 for positioning a UAV landing platform, in accordance with one or more embodiments of the present disclosure. For explanatory purposes, process 1000 is described with reference to FIGS. 1-9. Note that one or more operations in FIG. 10 may be combined, omitted, and/or performed in a different order as desired. According to various embodiments, process 1000 may be performed by a logic device, such as logic device 126 of UAV 106, controller 182 of landing platform 108, the logic device 150 for base station 146, or a combination of the aforementioned logic devices, which may be communicatively coupled to execute the operations of process 1000.

In block 1002, process 1000 includes system initialization. For example, one or more sensors, controls, or modules of a UAV system may be initialized for operation. Data may be received from various elements of the UAV system to determine a status of the UAV system, or subsystems thereof. In embodiments, one or more systems of UAV system may be reset. A notification may be generated for the user, such as to provide an indication of the status of UAV system, among other notifications.

In block 1004, process 1000 includes opening one or more doors of a container of the UAV system. The container may house a platform for a UAV. Opening the doors of the container may allow raising of the platform to a launch position, as detailed above.

In block 1006, process 1000 includes raising a folded platform to a launch position via a lift mechanism. For example, once doors are opened sufficiently, the folded platform/UAV may be raised via one or more linear actuators, such as in a manner as described above.

In block 1008, process 1000 includes determining an angle and a speed of an associated vehicle. For example, an angle and speed of the vehicle relative to the horizon may be determined, such as via one or more sensors of the vehicle, UAV system, or other devices.

In block 1010, process 1000 includes adjusting the platform to a desired angle. For instance, the platform may be adjusted level with the horizon via one or more electric motors and/or other devices (e.g., articulating arm assemblies). In embodiments, the platform may be angled to account for an angle of attack of the UAV needed for takeoff.

In block 1012, process 1000 includes deploying one or more folding sections of the platform to an open position. For example, folding elements may be pivotably coupled along edges of platform. The folding elements may deploy, such as automatically, as the elements clear the container or doors. In embodiments, a portion of the folding elements may catch against the container/doors to deploy the folding elements as the platform is raised. In embodiments, one or more associated actuators or motors may deploy the folding elements based on the position of the platform, such as once the platform is raised the folding elements are deployed.

In block 1014, process 1000 includes launching the UAV from the platform. For instance, the UAV positioned on the platform may take off, and once airborne, the UAV may perform various flight maneuvers, as detailed above.

In block 1016, process 1000 includes securing the platform (e.g., in the container) during UAV flight. For example, the platform can be collapsed (e.g., folding the folding elements to a closed position) and lowered to a stowed position (e.g., in the container). In embodiments, block 1016 may include closing the doors of the container. Lowering the platform into the container may fold the folding elements, such as a portion of the folding elements catching against the container/doors to collapse the folding elements. In embodiments, one or more associated actuators or motors may collapse the folding elements as or prior to the platform being lowered into the container.

In block 1018, process 1000 includes reversing the cycle to land UAV on the platform. For example, the platform may be raised from the container, the folding elements deployed, and the platform angularly adjusted to present a landing surface/platform for the UAV. In embodiments, the platform may be angled to account for the angle of attack of the UAV during landing. Once the UAV has landed on the platform, the platform can be folded up and lowered into the container. Once the platform is lowered into the container, the doors can be closed, and the system powered down or placed in a standby mode. Closing the doors of the container may secure the stored platform/UAV in the container.

After a UAV lands on the platform, it may come to rest in various positions and orientations relative to the center of the support plate and/or relative to a desired storage position. For example, the UAV may be equipped with four legs adapted to support the UAV on a rectangular support plate. A desired landing position may include all four legs on the support plate, with each leg at or adjacent to a different corner of the support plate. If one or more legs come to rest on the folding elements, the UAV may be out of position. If one or more legs is not at or adjacent to a corner of the support plate, the orientation of the UAV may be off.

In embodiments, the position and orientation of the UAV on the support plate may be adjusted by the folding elements, which are adapted to fold/collapse around the perimeter of the support plate and the UAV. In some embodiments, the folding elements may be biased to the unfolded/deployed position (e.g., via a hinged spring or other bias member) when the support platform is in a raised position. The folding elements may be pushed into the folded/collapsed position through contact with a frame of the container, or other component/structure disposed therein, as the support plate is lowered into the container. As the folding elements are pushed into the folded/collapsed position, contact between the UAV and one or more of the folding elements may push the UAV towards the center of support plate, trapping the UAV therein in a desired position and orientation. In this example, the position and orientation of the UAV is passively adjusted by the folding elements as the support platform is lowered into the container.

It may be desirable in some systems to actively adjust the position and orientation of the UAV on the support platform. An adjustment mechanism may be adapted to move one or more folding elements between a folded and unfolded position in response to commands received from a controller or logic device (e.g., controller 182, logic device 150, or another processing component). In some embodiments, the adjustment mechanism includes a motor and a linkage assembly adapted to translate motion generated by the motor into movement of the folding element. In various embodiments, the adjustment mechanism may include a pneumatic cylinder, a linear actuator, and/or other components adapted to generate movement or force to facilitate movement of folding elements as described herein. The adjustment mechanism may further include one or more rods, tracks, arms, linking members, pivoting members, connectors, and/or other components to connect the motor to the folding element to facilitate movement of the folding elements as described herein. In some embodiments, a method for positioning or aligning the UAV on a landing surface or platform includes control logic instructing one or more adjustment mechanisms to fold/unfold one or more of the folding elements to reposition/orient the UAV.

The folding elements may be adapted to assist with positioning and orienting the UAV on the landing platform under control of the logic device. The folding elements may be made of material(s) that are relatively strong, stiff, and light, such as aluminum, composite sheet material, or other material suitable for use as a landing platform and folding elements to position and orient a UAV as described herein. In some embodiments, each folding element is pivotably connected to the support plate, at or adjacent to the perimeter of the landing area. The folding elements may also be pivotably connected to adjacent folding elements in an interconnected arrangement creating an expanded landing platform and facilitating folding of the folding elements into a compact structure for positioning inside the container. The UAV may have a support structure such as multiple legs, skids, a ring attached to the legs, a structural base, or other features designed to support the UAV on the support plate and interact with the folding elements of the landing platform. In some embodiments, the UAV and support plate are designed such that UAV support structure extends to or adjacent to the perimeter of the support structure.

Figure 11E:
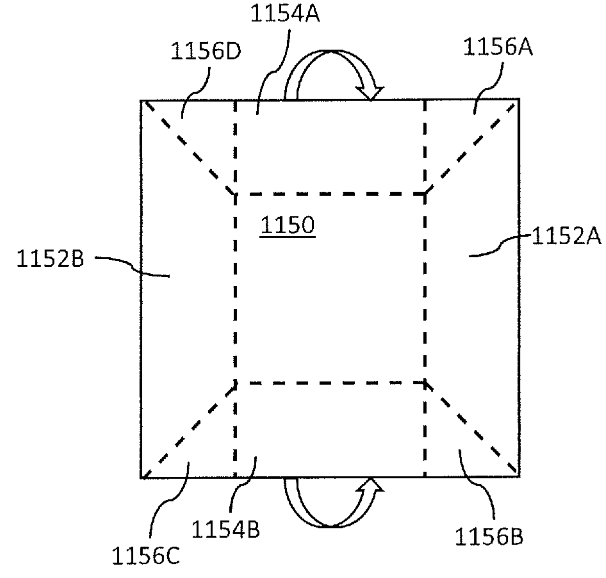
FIG. 11E illustrates an example landing platform including folding elements and linking folding elements, in accordance with one or more embodiments of the present disclosure.

Referring to FIGS. 11A-F, example implementations of landing platforms, including support plates and folding elements will be described in accordance with one or more embodiments. As illustrated in FIGS. 11A-C, a landing platform 1100 may include a rectangular support plate 1110 pivotably connected to a plurality of folding elements 1120A, 1120B, 1122A, and 1122B, arranged in perpendicular orientations to each other. In the launch position, as illustrated in FIGS. 11A-B, the folding elements are open to form an expanded landing surface for a UAV 1130 including the support plate and folding elements. The UAV 1130 may land at any position on the open landing platform, which may be flat or substantially flat with the folding elements oriented with a small incline in a funnel shape (e.g., at 19-degrees, less than 45-degrees, or another angle as appropriate). After the UAV lands, a first set of folding elements (e.g., the longer folding elements 1120A-B) of the landing platform 1100 are activated to fold up first, causing the UAV 1130 to move towards the center of the support plate 1110 in the middle of the first set of folding elements (e.g., along a vertical axis in the illustrated embodiment). Next, a second set of folding elements (e.g., the shorter folding elements 1122A-B) are activated to fold up, aligning the UAV 1130 in the middle of the second set of folding elements (e.g., along a horizontal axis in the illustrated embodiment).

In the embodiments illustrated in FIGS. 11A-C, each pair of folding elements 1120A-B and 1122A-B may be moved simultaneously or sequentially by one or more adjustment mechanisms (not illustrated). The landing platform 1100 and UAV 1130 may be adapted such that a base of the UAV 1130 (e.g., legs 1132) extends to a perimeter of the support plate 1110, such that a misalignment of the UAV 1130 may position one or more of the legs 1132 onto a folding element (1120A-B or 1122A-B) causing adjustment of the UAV 1130 position relative to the support plate 1110 as the folding elements are adjusted. As illustrated in FIG. 11C, this arrangement facilitates stabilization of the UAV 1130 in the folded landing platform 1100, as the UAV 1130 is secured by the folding elements.

It will be appreciated that the shape and orientation of the support plate and folding elements are not limited to a rectangular arrangement as illustrated in FIGS. 11A-C. For example, as illustrated in FIG. 11D, the folding elements (e.g., folding elements 1140A-D) may be diagonal to the sides of the support plate 1142. In another example, illustrated in FIG. 11E, a landing platform may include a rectangular support plate 1150, a pair of folding elements 1152A and 1152B pivotably attached to opposite sides of support plate 1150, and a pair of folding elements 1154A and 1154B, pivotably attached to the remaining sides of support plate 1150, in an arrangement perpendicular to the folding elements 1152A-B. A plurality of linking elements 1156A-D are provided to interconnect the folding elements 1152A-B and 1154A-B. For example, linking element 1156A has a first end pivotably attached to an end of folding element 1152A and a second end pivotably attached to an end of folding element 1154A; linking element 1156B has a first end pivotably attached to an end of folding element 1154B and a second end pivotably attached to an end of folding element 1152A; linking element 1156C has a first end pivotably attached to an end of folding element 1152B and a second end pivotably attached to an end of folding element 1154B; and linking element 1156D has a first end pivotably attached to an end of folding element 1154A and a second end pivotably attached to an end of folding element 1152A. In this arrangement, adjustment mechanisms may be provided to open/close folding elements 1154A-B. As the elements fold up into a closed position, linking elements 1156A-D pull the remaining linking members 1152A-B into the closed position.

In various embodiments, the four sides (1120A-B and 1122A-B or FIG. 11A, and/or 1152A-B and 1154A-B of FIG. 11E) of the folding sections are angled when deployed to create a "bowl" or "funnel" shape. The corners where the sections (e.g., linking members 1156A-D of FIG. 11E and/or the intersections of the four sides 1120A-B and 1122A-B and the support plate 1110 of FIG. 11A) meet help spin/orient the feet of the UAV to move it into the proper orientation for storage on the landing platform. The corners may act as grooves/guides that the feet drop into then ride within on their way to dropping into the landing platform.

Figure 11F:
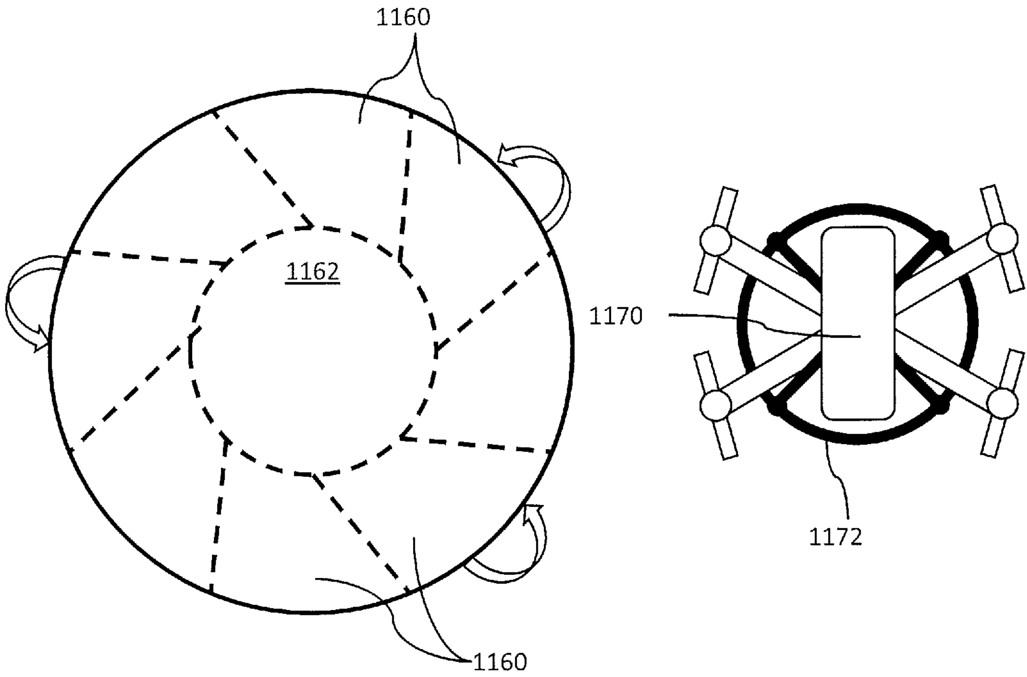
FIG. 11F illustrates an example circular landing platform, in accordance with one or more embodiments of the present disclosure.

In other examples, the shape of the landing platform and the number of folding elements is not limited to a rectangle with four sides. Referring to FIG. 11F, an example circular landing platform is illustrated including a circular support plate 1150, and a plurality of folding elements 1160 extending out from a perimeter of the support plate 1150. A UAV 1170 adapted for use with the circular landing platform may have a base that corresponds to the shape of the support plate 1150 and/or the final shape of the folded-up landing platform. For example, in the illustrated embodiment the UAV 1170 has a circular, ring-shaped base 1172 that matches the circular shape of the support plate. One or more of the folding elements 1160 is connected to an adjustment mechanism to move the folding elements 1160 into the folded position, thereby centering the UAV 1170 on the support plate 1150. In various embodiments, the ring-shaped base 1172 may be the item that is centered by the folding elements of the landing platform when fully folded into the final position.

In some embodiments, the landing platform, articulating sections and/or housing may be circular/cylindrical. As illustrated, the housing may include a cylinder portion for storing the UAV in the storage state and an opening on the top above which the landing platform and articulated sections extend in the land/launch state to increase the landing area. A landing platform is configured to fit within a cylindrical housing and may include a circular center portion for positioning a UAV thereon, and articulating sections that fan out forming an expanded circular landing area. In this embodiment, the landing components of the UAV may include a ring structure designed to fit on the landing platform. The folding elements, the landing platform and the door, may each be adapted to engage one or more actuators, such as a threaded lead screw, shaft or rod to enable the component connector to travel up and down the cylinder portion. As will be appreciated, other actuator mechanisms may be used as appropriate.

Referring to FIGS. 12A-H, example embodiments of a landing platform adapted to provide active control over the position and orientation of the UAV will now be described. It will be appreciated by those skilled in the art that the landing platforms described herein with reference to FIGS. 1-10 may be adapted to provide active control over the position and orientation of the UAV in accordance with the embodiments of FIGS. 11A-11E, 12A-12H and 13.

Additional embodiments will now be described with reference to FIGS. 12A-E, which illustrate examples of an improved system for storing, launching and landing a UAV. A system 1200 includes a container 1202 for storing and launching a UAV 1226 and a door 1204 (e.g., a protective cover) to protect the UAV 1226 and internal components of the container 1202. In various embodiments, the container 1202 may be generally box-shaped, cylindrically-shaped, or have another other shape appropriate for storing and launching a UAV as described herein. The door 1204, which may include one or more pieces, is pivotably connected to the container 1202. In some embodiments, the door 1204 is connected to the container 1202 through one or more hinges 1207 or similar connector and may include a spring to bias the door closed when not held open. In the illustrated embodiment, the door 1204 is opened and closed via an articulating arm 1206 connected to a base plate 1234, which is slidably coupled to a linear track 1232. One or more actuators 1230 are configured to slide the base plate 1234 along the linear track 1232 to raise and/or lower the base plate 1234. The articulating arm 1206 raises and lowers along with the base plate 1234 to open and close, respectively, the corresponding door 1204.

In embodiments, one or more of the mechanisms such as the landing platform 1240, the folding elements 1222, linking elements 1242, and/or one or more actuators 1230 (e.g., activating one or more arms or hinges) are designed to engage the door 1204 to open the door 1204 when in the launch and landing state. As the landing platform 1208 is lowered, the door 1204 may be released and closed (e.g., release pressure biasing open the door 1204, controlling the actuator(s) 1230 to close the door 1204, etc.) as the folding elements 1222 and the UAV 1226 are pulled inside the container 1202. Thus, the system 1200 includes a landing platform 1240 that may be raised and lowered to change states from the protective storage state to the unfolded state for extending the landing platform size.

In various embodiments, one or more of the folding elements 1222, the doors(s) 1204, and the landing platform 1240 may be moved via the one or more actuators 1230. Each moving component may include one or more articulated arms, rods, or other components movable by use of an actuator 1230. For example, each door 1204 is connected to the container 1202 through a corresponding hinge 1207 or arm which is connected to an actuator (e.g., a motor). The system 1200 may house control electronics, a memory, and other components as described herein (e.g., as described in FIG. 1A) and/or may communicate with an external control system providing control of the one or more actuators 1230.

Figure 12A:
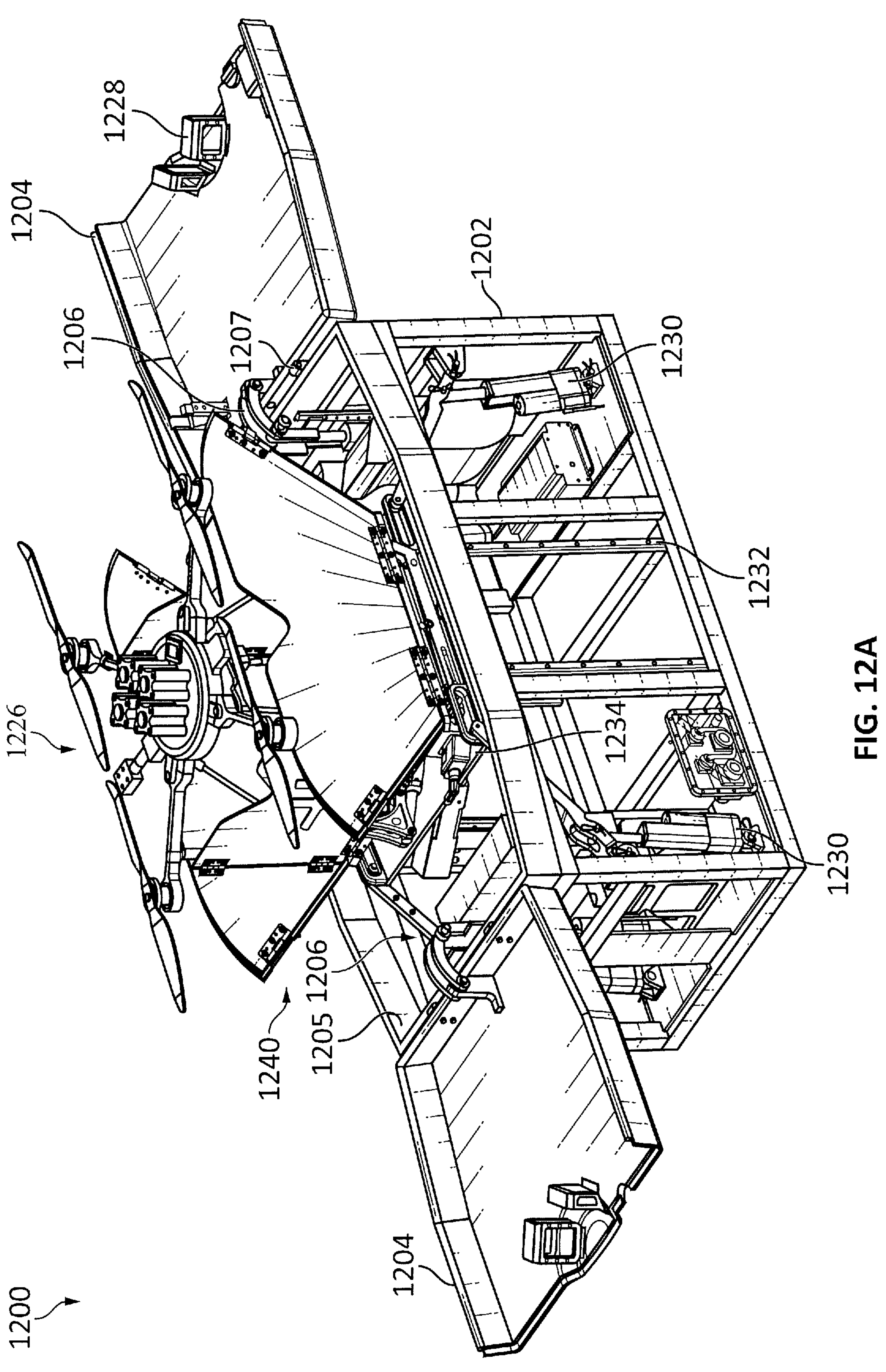
FIG. 12A illustrates a landing platform with folding elements in a closed position to align a UAV in a land/launch system, with portions of the land/launch system shown transparent for illustration purposes, in accordance with one or more embodiments of the present disclosure.
Figure 12B:
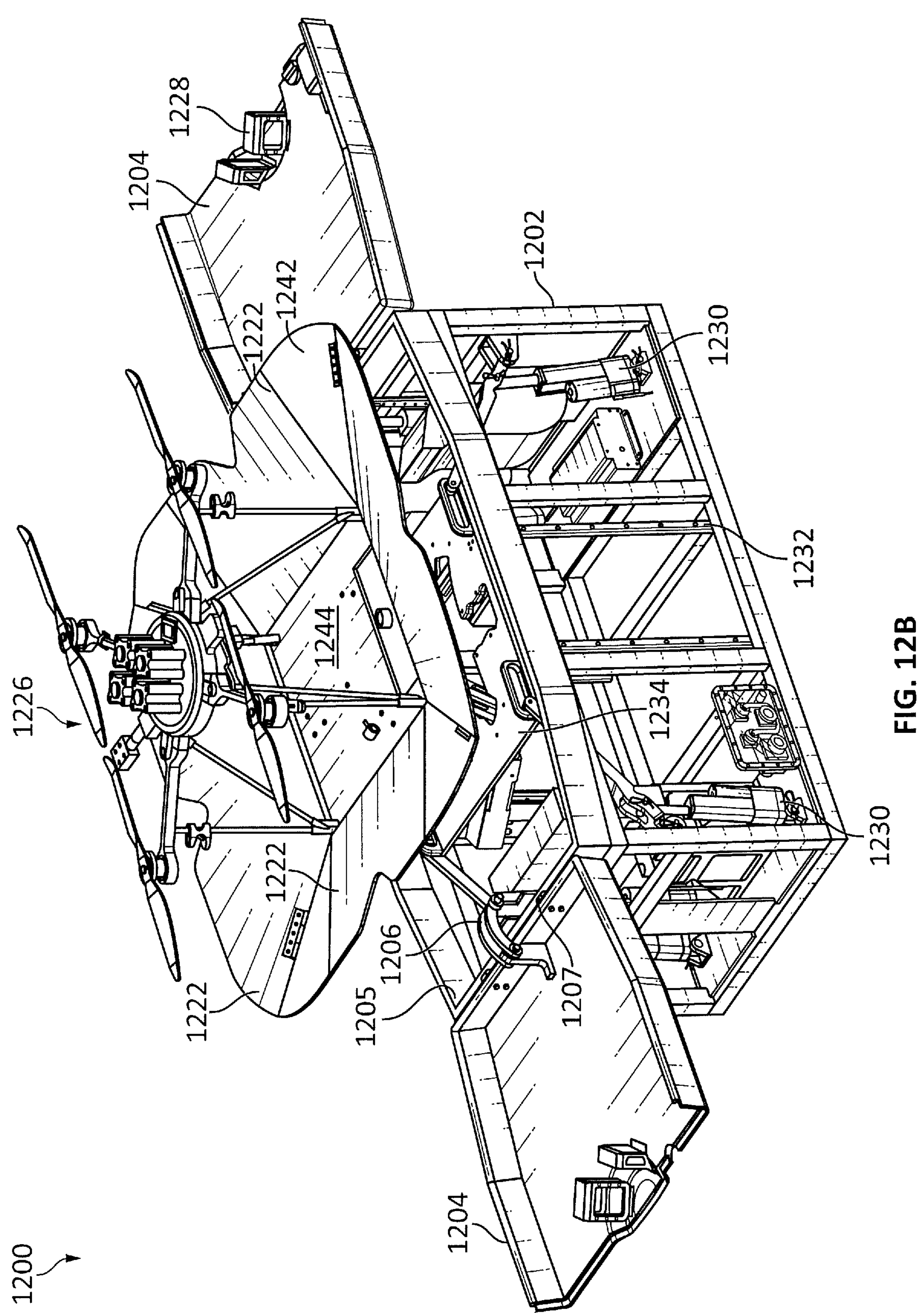
FIG. 12B illustrates the landing platform of FIG. 12A with folding elements in an open position, with portions of the land/launch system shown transparent for illustration purposes, in accordance with one or more embodiments of the present disclosure.
Figure 12C:
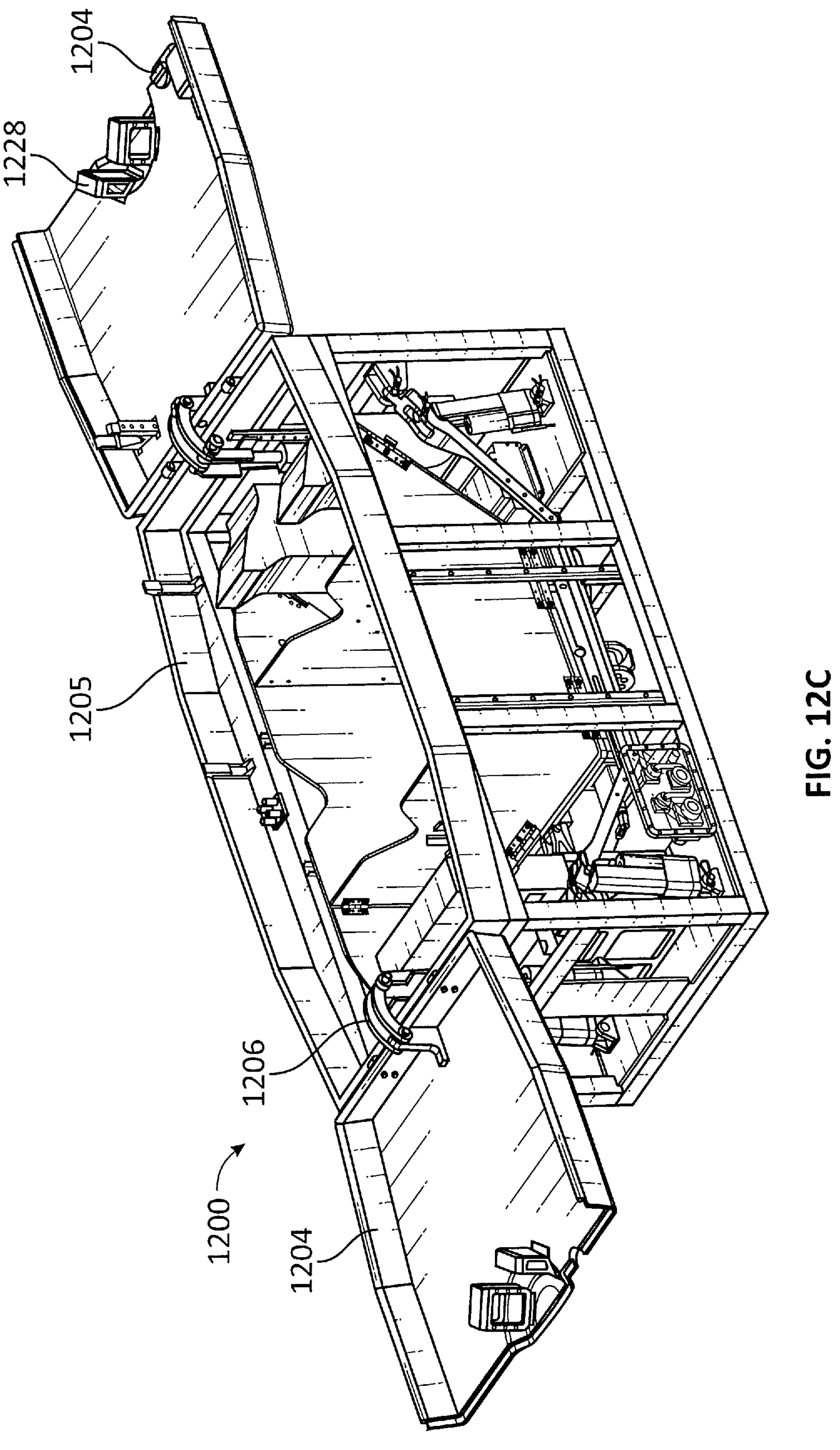
FIG. 12C illustrates the landing platform of FIG. 12A with the landing platform and folding elements stored within the land/launch system, with portions of the land/launch system shown transparent for illustration purposes, in accordance with one or more embodiments of the present disclosure.
Figure 12D:
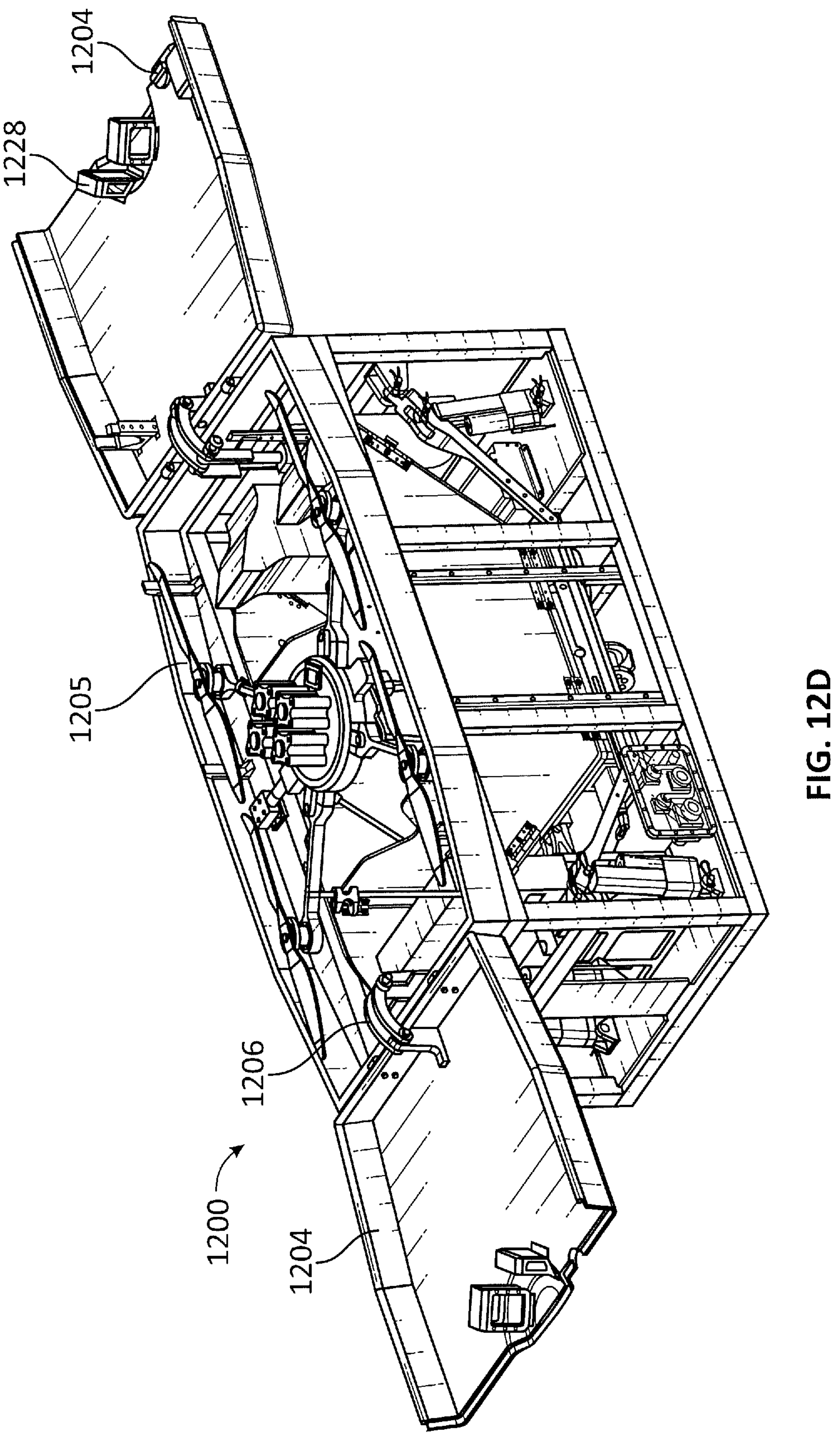
FIG. 12D illustrates the landing platform of FIG. 12C with the landing platform, folding elements, and UAV stored within the land/launch system, with portions of the land/launch system shown transparent for illustration purposes, in accordance with one or more embodiments of the present disclosure.
Figure 12E:
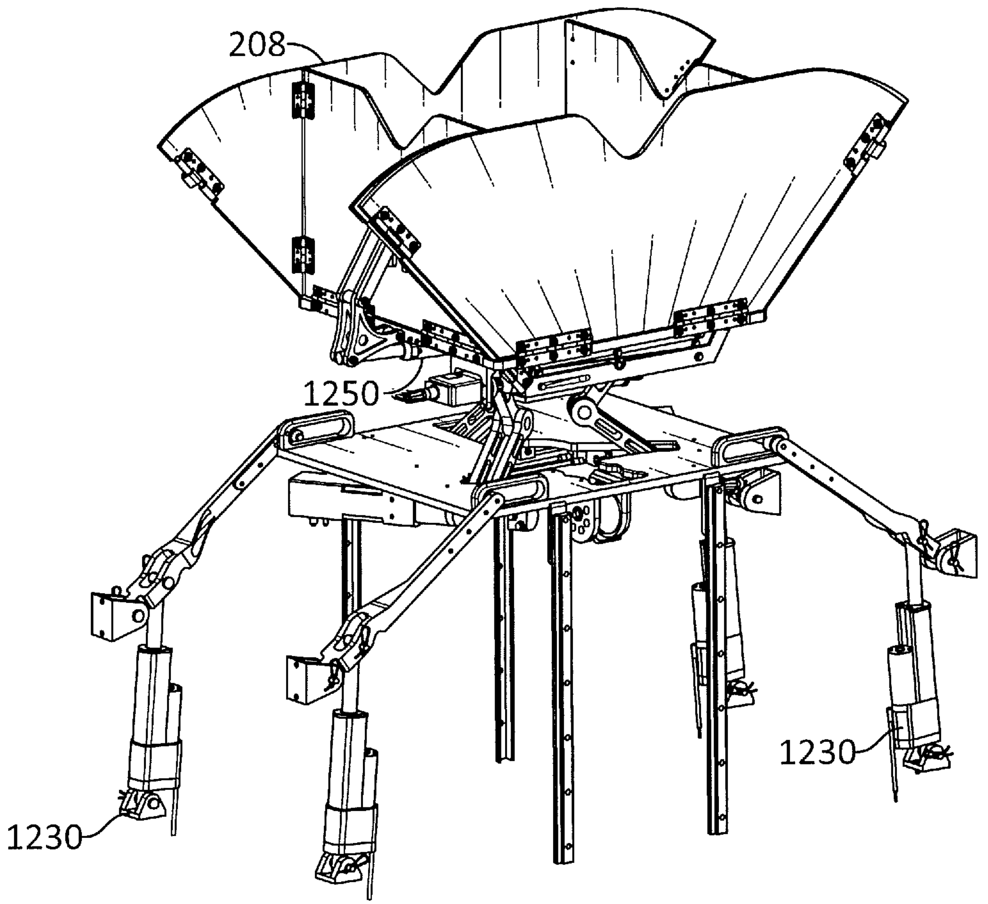
FIG. 12E illustrates the landing platform of FIG. 12A with the folding elements in a closed position, in accordance with one or more embodiments of the present disclosure.
Figure 12F:
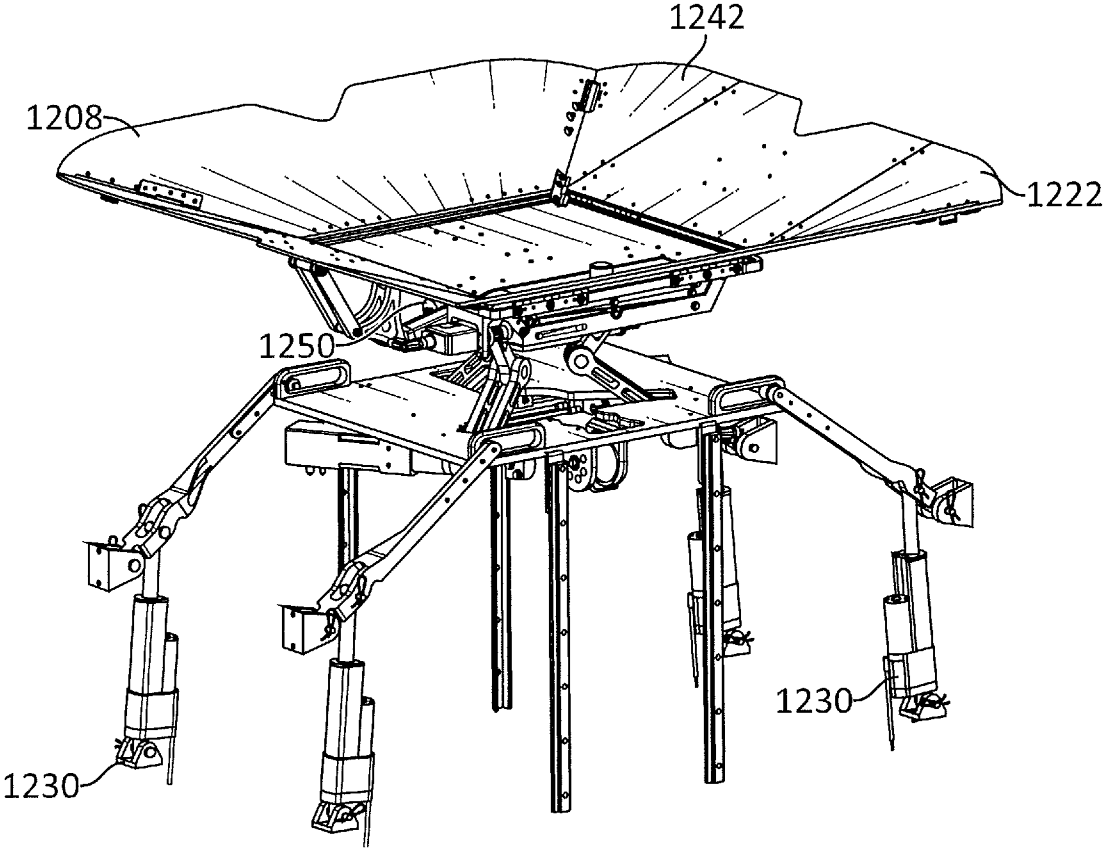
FIG. 12F illustrates the landing platform of FIG. 12E with the folding element in an open position, in accordance with one or more embodiments of the present disclosure.

When the base plate 1234 is raised, the system 1200 is adapted to facilitate UAV 1226 launching and landing, as illustrated in FIG. 12B. In the launch/land state, the door 1204 is open, the landing platform 1240 open is positioned outside the container 1202 to facilitate launching the UAV 1226 from the landing platform 1240 and landing the UAV 1226 on the landing platform 1240. In some embodiments, landing platform 1240 is positioned adjacent to or above the opening 1205. In operation, one or more actuators 1230 within the container 1202 are configured to selectively raise and lower the base plate 1234 and landing platform 1240 to move between (i) a storage state in which the landing platform 1240, and the UAV 1226 when positioned thereon (e.g., as illustrated in FIG. 12C), are protected inside the container 1202 and one or more doors 1204, and (ii) a launch/landing state as illustrated in FIGS. 12A-B. The landing platform 1240 may include a flat and/or funnel shaped landing surface which allows the UAV 1226 to position itself on the landing platform 1240. In some embodiments, the UAV 1226 may be positioned on the landing platform 1240 to provide a charging and/or communication coupling between the UAV 1226 and components of the landing platform 1240. The landing platform 1240 may further include a plurality of folding elements 1222 hinged around a perimeter of the main landing platform 1244. In various embodiments, the landing platform 1240 includes hinges, actuators, and/or other components that bias the folding elements 1222 outward away from the center of the landing platform 1244 when the landing platform 1240 is in the launching/landing state. The folding elements 1222 provide a foldable surface to expand the landing surface in the launching/landing state.

When the actuator(s) 1230 are controlled to lower the landing platform 1208, the landing platform 1240 is lowered within the container 1202, which positions the UAV 1226 inside the container 1202 into a protective storage state. As the landing platform 1240 is lowered, each of the folding elements 1222 is folded into the contained 1202 at its respective hinge 1207. In some embodiments, one or more of the folding elements 1222 may be folded by the interior walls of the container 1202 or a component mounted therein. In some embodiments, the folding elements are folded by one or more actuators 1250. In some embodiments, the order/sequence in which the folding elements 1222 are folded is controlled by and/or designed into the system 1200 and may include one or more actuators, biasing members (e.g., springs), physical guides (e.g., the walls of the container 1202), and/or other components.

In accordance with one or more embodiments, the landing platform 1240 is generally shaped like a funnel to facilitate positioning of the UAV 1226 in the center of the landing platform 1208 (e.g., for electrical connection with components of the container 1202 such as power and/or communications). The UAV 1226 is similarly shaped to engage the landing platform 140 to facilitate the self-centering of the UAV 1226 after landing. For example, the UAV 1226 in the illustrated embodiment has four legs that correspond to four corners of the landing platform 1240A. In some embodiments, when the UAV 1226 lands out of alignment, the funnel-shaped landing platform 1208 facilitates the centering of the UAV 1226 via gravity as the legs may slide down the folding elements 1222 to compensate for last second variations and inaccuracies.

The folding elements 1222 are also designed to facilitate positioning of the UAV 1226 on the landing platform 1240. As each folding element 1222 moves into a folded position (e.g., is raised), it may contact portions of a misaligned UAV 1226 which is pushed towards the center of the landing platform 1240 into a proper alignment. For example, if a leg of the UAV 1226 lands on a folding element 1222, the raising of the folding element 1222 will reposition the leg towards a center portion of the landing platform 1240. In some embodiments, the folding elements 1222 and landing components of the UAV 1226 are designed to secure the UAV 1226 within the raised folding elements 1222. In the illustrated embodiment, for example, the UAV 1226 has four legs that correspond to four corners of the landing platform 1208, allowing the UAV 1226 to be securely positioned in the container 1202 between the folding elements 1222. In some embodiments, the system 1200 may include additional stabilizing elements, such as stabilizers 1228 positioned on the door 1204 to engage and secure the UAV 1226 when the doors 1204 are closed.

Figure 12G:
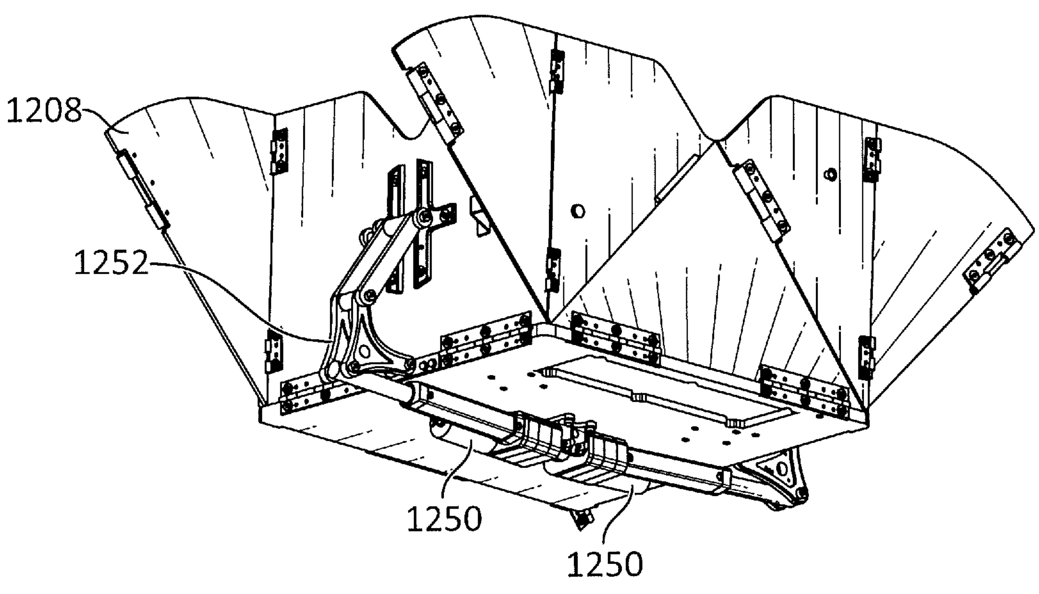
FIG. 12G illustrates the landing platform of FIG. 12A with the folding elements and adjustment mechanism in a closed position, in accordance with one or more embodiments of the present disclosure.
Figure 12H:
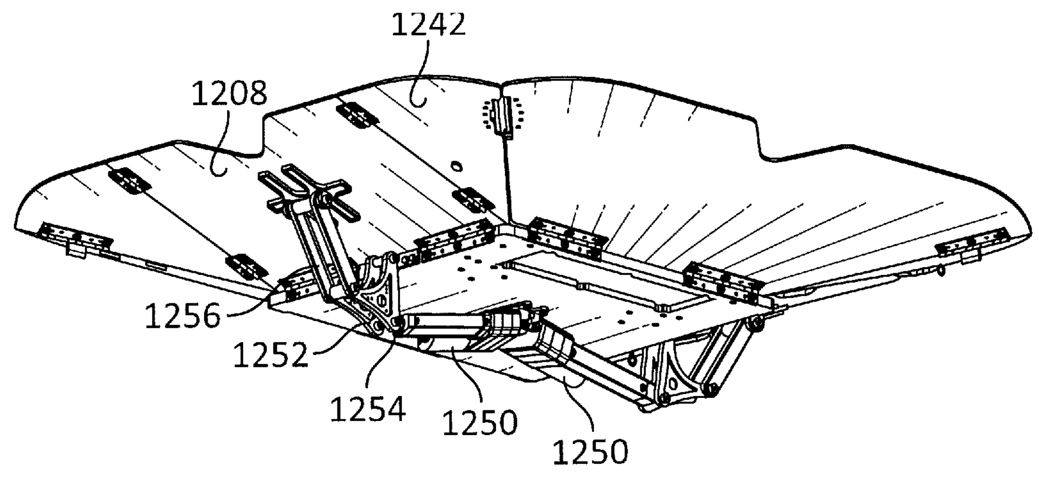
FIG. 12H illustrates the landing platform of FIG. 12G with the folding elements and adjustment mechanism in an open position, in accordance with one or more embodiments of the present disclosure.

In some embodiments, the UAV 1226 is configured to land in the landing platform (e.g., the landing platform 1240) where it is repositioned towards the center of the platform as the folding elements 1222 are folded. The folding elements 1222 may be controlled through one or more mechanisms as previous described depending on the configuration. In one embodiment, the folding elements 1222 engage the UAV 1226 to direct the UAV 1226 into the center of the landing platform 1240. In operation, the control system is configured to selectively activate the one or more actuators 1250 to fold or unfold the folding elements 1222 in an order and speed to facilitate repositioning of the UAV 1226 on the landing platform 1240. As illustrated in FIGS. 12E-H, a folding element may be controlled through a linear actuator that pushes a hinged member 1252 to fold the folding element (as illustrated in FIG. 12G), and pull the hinged member 1252 to unfold the folding element (as illustrated in FIG. 12H). The hinged member 1252 is pivotably connected to the landing platform at a pivot point 1254, which is proximate to the pivot point of the hinged folding element. The hinged member is also pivotably attached to an arm 1256 that engages the folding element to push (e.g., fold) or pull (e.g., unfold) the folding element in response to the actuator 1250.

In some embodiments, the actuators 1230 are configured to lower the landing platform 1208 into the container 1202, and the folding elements 1222 are then folded for positioning inside the contained 1202 by the one or more actuators 1250 and/or the sides of the contained 1202 into the folded position illustrated in FIG. 12C. In some embodiments, the actuators 1250 are controlled to fold up the folding elements 1222 before lowing the landing platform 1240. As the landing platform 1240 is raised by one of the actuators 1230, the folding elements 1222 clear the sides of the container 1202 and a bias in the hinge 1207 and/or an actuator 1230 pushes the folding element 1222 out to the launch position as illustrated in FIG. 12B.

A process for positioning a UAV on a landing surface or platform will now be described with reference to FIG. 13. This method uses folding sections of the landing platform to move the aircraft towards the center position of the landing platform. As the UAV descends for landing, the folding sections would initially be deployed (e.g., open in a funnel shape), to act as the landing platform. Once the aircraft lands on the landing platform, the sections would then start to fold up. In FIG. 12 below, there are sections arranged in perpendicular orientations to each other. The longer sections would fold up first, positioning the aircraft in one axis, then the shorter second set of sections would fold up to do the final positioning in the other axis. The orientation of the sections is not limited to being parallel to the sides, as is shown in FIG. 12, they could also be diagonal to the sides of the platform, as long as the sections are oriented in such a fashion that when they finally fold up, the aircraft is positioned on the platform, as desired.

In one embodiment, the platform is positioned within the cylinder with a linear actuator that moves the platform vertically in the cylinder. In some embodiments, a plurality of housings may be arranged together and configured to operate without obstructing each other to allow for storage and launching of multiple UAVs. In some embodiments, when in the launch/land state, the active platform is raised above the others and may be as wide as desired. In various embodiments, one or more housings may be installed on a vehicle or other apparatus, or may be implemented as a standalone device. The systems of FIGS. 11-15 may be implemented using any of the electrical and processing components described herein (e.g., as described with reference to FIGS. 1A-10).

Figure 13:
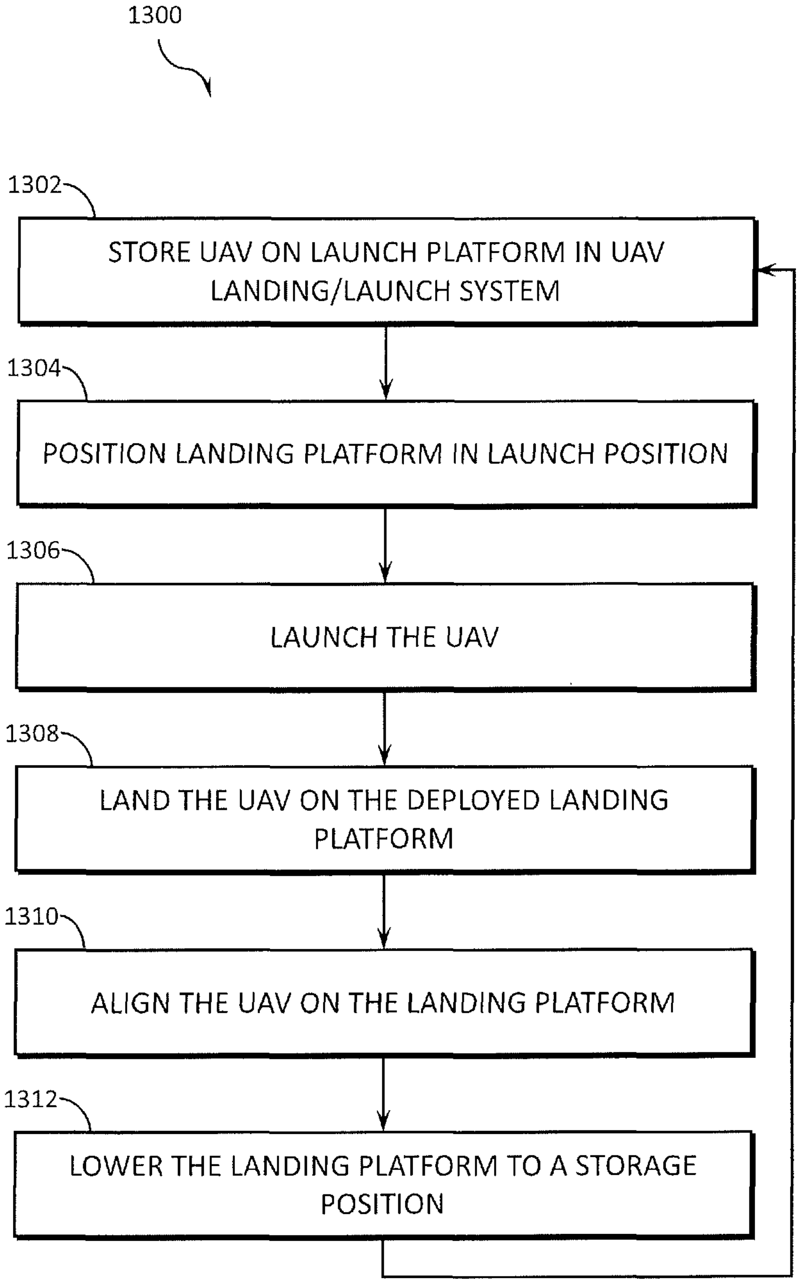
FIG. 13 illustrates a flow diagram of a process for aligning a UAV on a landing platform with folding elements, in accordance with one or more embodiments of the present disclosure.

FIG. 13 illustrates a flow diagram of a process 1300 for positioning a UAV on a landing platform, in accordance with one or more embodiments of the present disclosure. For explanatory purposes, process 1300 is described with reference to FIGS. 1-12E. Note that one or more operations in FIG. 13 may be combined, omitted, and/or performed in a different order as desired. According to various embodiments, process 1300 may be performed by a logic device, such as logic device 126 of UAV 106, controller 182 of landing platform 108, the logic device 150 for base station 146, or a combination of the aforementioned logic devices, which may be communicatively coupled to execute the operations of process 1300.

In block 1302, a UAV is stored on a landing platform of a UAV landing/launch system. In some embodiments, the UAV is stored inside of a housing with a closed cover, providing protection from external elements such as weather and debris. In various embodiments, the UAV landing/launch system may be a standalone system, a component of a larger system comprising a plurality of landing/launch systems, mounted to a vehicle, or used in another arrangement. In some embodiments, an operator terminal may be used to prepare the UAV for flight, which may include charging the UAV and configuring the UAV for its next mission, such as programming a flight path and defining image capture objectives.

In block 1304, the landing platform is moved to the launch position. In some embodiments, the operator terminal transmits instructions to the UAV landing/launch system (e.g., UAV land/launch system 200 from FIG. 2) to prepare the UAV for launch. The control system of the UAV landing/launch system controls one or more actuators to open the cover, raise the UAV through the opening in the UAV landing/launch system opening, and extend the articulated segments. In some embodiments, one or more actuators raise the landing platform, which pushes open the cover. In some embodiment, the cover is connected to an actuator that is instructed to open and close the cover.

In block 1306, the UAV is launched. In some embodiments, the UAV is retained on the launch platform through an attachment mechanism and the UAV launch sequence includes releasing the attachment mechanism. The launch and flight of the UAV may be preprogrammed and/or controlled by as instructed by the operator terminal. For example, during flight, the operator may control and/or monitor the UAV(s) using the operator terminal.

In block 1308, the UAV returns to the landing platform. In some embodiments, the UAV is guided to land towards the center of the landing platform, but may not be perfectly aligned due to error, wind, or other factors. In step 1310, the UAV is aligned on the landing platform. In some embodiments, one or more actuators are activated to sequentially raise one or more articulated sections, with each articulated segment correcting a potential alignment error in the UAV. When the articulated segments are raised, the UAV is generally aligned with the landing platform.

In block 1312, the landing platform is lowered to the storage position where it is stored for further use. In some embodiments, the UAV may be connected to charge batteries and/or communications with a control system, such as the operator terminal. In the storage position, the cover is closed (e.g., via one or more actuators, automatically as the lowered landing platform removes a bias maintaining the cover in an open positon, etc.). The UAV is stored for protection, charging and communication with the operator terminal. In some embodiments, the UAV may download flight data and other acquired information to the operator terminal.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the present disclosure. It should also be understood that numerous modifications and variations are possible in accordance with the principles of the present disclosure. Accordingly, the scope of the invention is defined only by the following claims.

What is claimed is:

1. A system comprising:

a platform adapted for launching and/or landing an unmanned aerial vehicle (UAV), the platform comprising:

a support plate adapted to support the UAV;

a plurality of folding elements pivotably coupled to the support plate to move between closed and open positions, the closed position holding the UAV to the support plate, and the open position allowing the UAV to launch from and/or land on the support plate; and one or more folding element actuators configured to move at least one of the plurality of folding elements from the open position to the closed position to align the UAV on the support plate; and a logic device for controlling the one or more folding element actuators via signals to control movement of the folding elements, the logic device being configured, upon landing of the UAV, to:

selectively activate a first set of one or more of the folding element actuators to fold up a first set of the folding elements and cause the UAV to move towards a center of the support plate along a first axis; and then selectively activate a second set of one or more of the folding element actuators to fold up a second set of one or more of the folding elements and cause the UAV to move towards the center of the support plate along a second axis transverse to the first axis.

2. The system of claim 1, wherein:

in the open position the plurality of folding elements form a landing area with the support plate; and the folding elements and the support plate are arranged to form grooves at their intersections to interact with a landing gear of the UAV for rotating the UAV into the closed position.

3. The system of claim 1, further comprising an articulating arm assembly coupling one or more motors to the support plate.

4. The system of claim 1, further comprising:

a container, the platform secured within the container and movable between a launch position and a stowed position via a lift mechanism;

wherein the support plate is circular, and the folding elements extend out and in a predefined circumferential direction from a perimeter of the support plate;

wherein movement of the platform from the stowed position to the launch position deploys the folding elements from the closed position to the open position; and wherein movement of the platform from the launch position to the stowed position collapses the folding elements from the open position to the closed position.

5. The system of claim 4, further comprising a first vehicle to which the container is mounted.

6. A system comprising:

a container;

a platform adapted for launching and/or landing an unmanned aerial vehicle (UAV), the platform movable between a stowed position within the container and a deployed position, the platform comprising:

a support plate adapted to support the UAV;

a plurality of folding elements pivotably coupled to the support plate to move between closed and open positions, the closed position holding the UAV to the support plate, and the open position allowing the UAV to launch from and/or land on the support plate;

one or more platform-moving actuators to move the platform between the stowed position and the deployed position; and one or more folding element actuators configured to move at least one of the plurality of folding elements from the open position to the closed position to align the UAV on the support plate before moving the platform into the stowed position.

7. The system of claim 6, further comprising:

a base plate slidably coupled to a linear track; and, one or more motors mounted to the base plate to control a position of the support plate relative to the base plate;

wherein the one or more platform-moving actuators are configured to slide the base plate along the linear track; and wherein the one or more folding element actuators are configured to move each of the plurality of folding elements from the open position to the closed position to align the UAV on the support plate before moving the platform into the stowed position.

8. The system of claim 7, further comprising:

a first lift arm coupling a first set of platform-moving actuators of the one or more platform-moving actuators to the base plate; and a second lift arm coupling a second set of platform-moving actuators of the one or more platform-moving actuators to the base plate, wherein each platform-moving actuator of the first set of platform-moving actuators and the second set of platform-moving actuators is a linear actuator.

9. The system of claim 6, further comprising:

link members between adjacent ones of the folding elements such that folding of one or more first ones of the folding elements mechanically causes folding of one or more second ones of the folding elements;

wherein at least a portion of the folding elements, when in the closed position, is adapted to trap on a feature of the UAV to hold the UAV in place on the support plate; and wherein the system further comprises:

one or more sensors to detect the orientation of the support plate relative to the horizon; and a logic device configured to:

control the one or more motors to align the support plate with the horizon based on the detected orientation of the support plate.

10. A method of operating the system of claim 8, the method comprising:

detecting an orientation of the support plate; and adjusting, based on the detected orientation, the platform to a desired angle.

11. A method comprising:

receiving an unmanned aerial vehicle (UAV) on a platform, the platform comprising:

a support plate adapted to support the UAV;

a plurality of folding elements pivotably coupled to the support plate to move between closed and open positions, the closed position holding the UAV to the support plate, and the open position allowing the UAV to launch from and/or land on the support plate; and one or more folding element actuators configured to move at least one of the plurality of folding elements from the open position to the closed position; and aligning the UAV on the support plate by moving two or more of the plurality of folding elements from the open position to the closed position;

wherein the aligning comprises controlling by a logic device movement of the folding elements via signals upon landing of the UAV to:

selectively activate a first set of one or more of the folding element actuators to fold up a first set of the folding elements and cause the UAV to move towards a center of the support plate along a first axis; and then selectively activate a second set of one or more of the folding element actuators to fold up a second set of one or more of the folding elements and cause the UAV to move towards the center of the support plate along a second axis transverse to the first axis.

12. The method of claim 11, wherein;

the one or more folding element actuators are configured to move each of the plurality of folding elements from the open position to the closed position to align the UAV on the support plate before moving the platform into the closed position;

in the open position the plurality of folding elements form a landing area with the support plate; and the folding elements and the support plate are arranged to form grooves at their intersections to interact with a landing gear of the UAV for rotating the UAV into the closed position.

13. The method of claim 11, further comprising:

raising the platform to a launch position via a lift mechanism; and lowering the platform to a stowed position via the lift mechanism.

14. The method of claim 13, further comprising:

using one or more motors mounted to a base plate to control a position of the support plate relative to the base plate; and using one or more platform-moving actuators to slide the base plate along a linear track.

15. The method of claim 14, wherein using the one or more platform-moving actuators comprises:

using a first lift arm coupling a first set of platform-moving actuators of the one or more platform-moving actuators to the base plate; and using a second lift arm coupling a second set of platform-moving actuators of the one or more platform-moving actuators to the base plate, wherein each platform-moving actuator of the first set of platform-moving actuators and the second set of platform-moving actuators is a linear actuator.

16. The method of claim 15, wherein the platform further comprises an articulating arm assembly coupling each motor of one or more motors to the support plate.

17. The method of claim 13, wherein the platform further comprises link members between adjacent ones of the folding elements, the method further comprising:

folding the folding elements to a closed position, wherein folding of one or more first ones of the folding elements engages the link members to mechanically cause folding of one or more second ones of the folding elements.

18. The method of claim 17, wherein:

at least a portion of the plurality of folding elements, when in the closed position, is adapted to trap on a feature of the UAV to hold the UAV in place on the support plate.

19. The method of claim 17, further comprising:

opening one or more doors of a container housing the platform to allow the raising the platform to the open position;

closing the one or more doors of the container to secure the platform stored in the container in the closed position; and launching the UAV from the platform.

20. The method of claim 11, further comprising adjusting the platform by:

detecting the orientation of the support plate relative to the horizon; and controlling one or more motors to align the support plate with the horizon based on the detected orientation of the support plate.

* * * * *